(12) United States Patent
Kinkead et al.

(10) Patent No.: US 6,708,773 B1
(45) Date of Patent: Mar. 23, 2004

(54) METHOD AND APPARATUS FOR AN AERATOR WITH DIFFERENTIAL, STEERING ASSIST AND POWER LIFTING

(75) Inventors: John B. Kinkead, St. Paul, MN (US); Loren F. Hansen, Lincoln, NE (US); Donavon D. Kotula, Apple Valley, MN (US); Thomas E. Isaman, Ham Lake, MN (US); Robert Brophy, Raymond, NE (US)

(73) Assignee: Turfco Manufacturing, Inc., Blaine, MN (US)

( * ) Notice: Subject to any disclaimer, the term of this patent is extended or adjusted under 35 U.S.C. 154(b) by 0 days.

(21) Appl. No.: 10/293,528

(22) Filed: Nov. 12, 2002

(51) Int. Cl.[7] .............................................. A01B 45/02
(52) U.S. Cl. ........................................... 172/21; 172/42
(58) Field of Search .............................. 172/21, 22, 42, 172/43, 48, 51, 245, 247, 250, 253, 540–544, 611, 662, 705; 56/256, 295; 111/135

(56) References Cited

U.S. PATENT DOCUMENTS

| 2,229,497 A | 1/1941 | Dontje |
| 2,260,110 A | 10/1941 | Blohm |
| 2,649,061 A | 6/1953 | Hawkins et al. |
| 2,750,859 A | 6/1956 | Smithburn |
| 2,823,597 A | 2/1958 | Cadwallader |

(List continued on next page.)

OTHER PUBLICATIONS

Plugr Walk Behind Power Aerators, web page, (5 pgs.)–no date–.
Billy Goat Industries—EZair Aerators, web page (2 pgs.) –no date–.
Classen Manufacturing, Inc., web page (2 pgs.) –no date–.
BlueBird International Products–Turf Care, web page (1 pg.) –no date–.
BlueBird International Products–Turf Care–424, web page (2 pgs.) –no date–.

Primary Examiner—Robert E. Pezzuto
(74) Attorney, Agent, or Firm—Jeffrey R. Stone; Briggs and Morgan, P.A.

(57) ABSTRACT

An aerator that allows the operator to make a turn with the machine while the tines are still in contact with the turf through the use of a differential shaft and brakes that enhance the maneuverability of the machine. The aerator is fitted with a mechanical gear type differential on an intermediate drive shaft that provides for automatic, separate and variable rotational motion of the individual halves of the tine shaft. This differential apparatus also provides constant and equal torque application to both sides of the tine wheel assembly simultaneously while the machine is operating. This insures that tine penetration into the turf is equal on both sides at all times. The tine shaft halves are designed and mounted in such manner as to allow each half (left and right sides) to be driven by separate chains from the differential shaft. This design results in a desired variation in the speed of rotation of the two halves that facilitates turning the unit. The differential mechanism is also functional in driving the transport rollers at the front of the machine. The improved aerator is also fitted with brakes installed on each side of the unit which can reduce the speed of rotation of the separate tine wheel halves and the individual drive rollers on the front of the unit, thus increasing the steering efficiency and a spring-actuated lift assist to help the operator raise the unit into the transport position. The aerator includes heavy duty springs on both sides of the unit to apply equal forces to both of the transport wheel lift members. A release mechanism operated from the handle bar is provided to allow the operator to disengage the retaining latches, which will allow these springs to pull the transport wheels under the unit thus raising the tine shaft halves. The aerator also incorporates drums of sufficient mass so as to not require the addition of water or other additional weighting methods.

36 Claims, 11 Drawing Sheets

U.S. PATENT DOCUMENTS

| | | |
|---|---|---|
| 2,835,182 A | 5/1958 | Smithburn |
| 2,888,994 A | 6/1959 | Hoff et al. |
| 4,336,760 A | 6/1982 | Cohen et al. |
| 4,438,873 A | 3/1984 | Kaercher, Jr. |
| 5,009,270 A | 4/1991 | Vangsgard |
| 5,307,952 A | 5/1994 | Worrel et al. |
| 5,307,965 A | 5/1994 | Worrel |
| 5,454,433 A | 10/1995 | Worrel et al. |
| 5,478,104 A | 12/1995 | Worrel et al. |
| 5,571,252 A | 11/1996 | Worrel et al. |
| 5,673,756 A | 10/1997 | Classen |
| 5,680,903 A | 10/1997 | Oliver |
| 5,794,708 A | 8/1998 | Brophy |
| 5,802,994 A | 9/1998 | Kinkead et al. |
| 6,024,033 A | 2/2000 | Kinkead et al. |
| 6,058,860 A | 5/2000 | Kinkead et al. |
| 6,102,129 A | 8/2000 | Classen |
| 6,149,079 A | 11/2000 | Kinkead et al. |
| 6,179,061 B1 | 1/2001 | Fiore |
| 6,241,025 B1 | 6/2001 | Myers et al. |
| 6,273,197 B1 | 8/2001 | Marlow |
| 6,415,872 B2 | 7/2002 | Myers et al. |

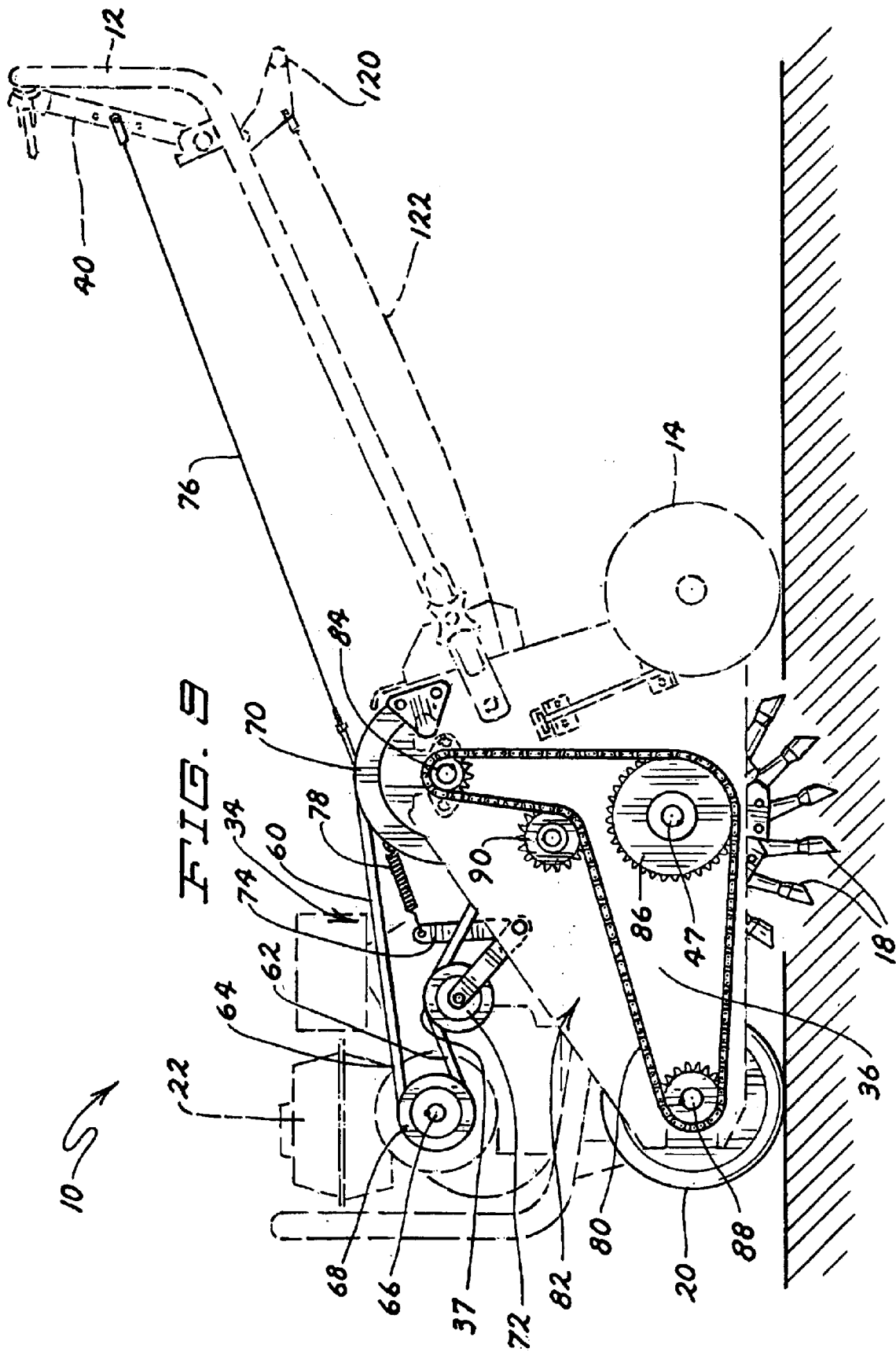

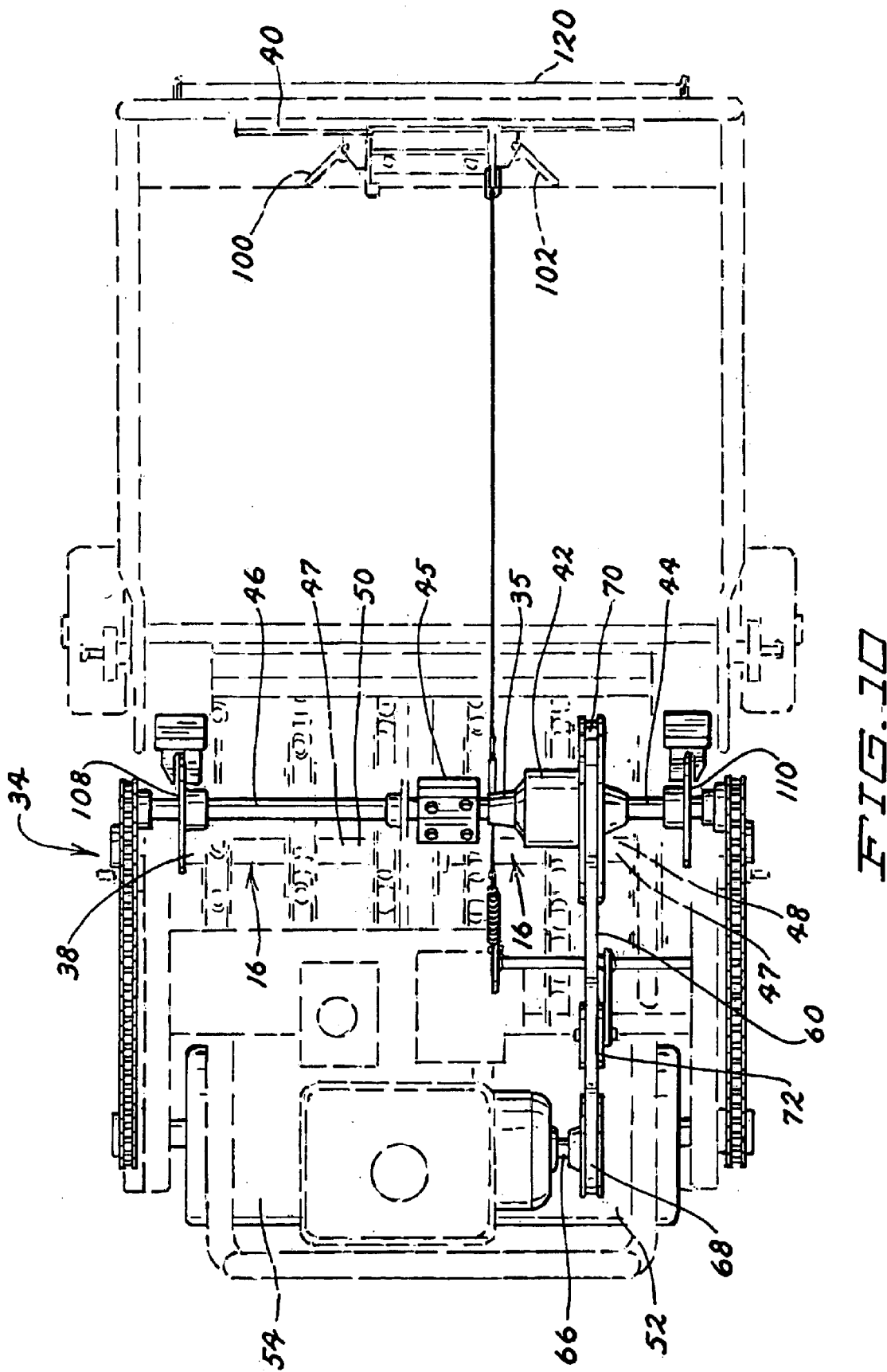

METHOD AND APPARATUS FOR AN AERATOR WITH DIFFERENTIAL, STEERING ASSIST AND POWER LIFTING

FIELD OF THE INVENTION

This invention relates generally to lawn maintenance equipment, particularly to powered turf treatment devices used for aerating a lawn.

BACKGROUND OF THE PRESENT INVENTION

Thick green lawns require care. Such care includes consistent mowing, watering, dethatching, seeding and fertilization. In addition, aeration contributes significantly to the overall health of a lawn. Aeration is accomplished by creating a number of small holes in the ground surface designed to increase penetration of water, oxygen and nutrients while also providing receptacles for grass seed and nutrients thus preventing them from being washed away during watering or as a result of heavy rains. The increased ventilation resulting from aeration further enhances the decomposition process necessary to reduce thatch buildup.

The process of making holes in the turf with current machines is not an easy task and operators complain about the difficulty in using such units. Making turns with this type of unit is the most difficult part of the operation because the tines are imbedded into the ground and all of the powered tine wheels in known machines are either rotating at the same speed or the rotation of one half of the tines is completely stopped while the other half of the tines continue to rotate. When the tine wheels of this type of machine are in contact with the ground it is impossible to make a turn without damaging the turf, which is extremely undesirable in certain sites, such as on golf courses. The damage occurs as a result of the tines tearing the turf and because it is impossible to stop the drive rollers from sliding across the surface of the turf. As a consequence of the embedded tines, the operator must exert a great deal of effort to turn the aerator.

Current machines require that the tines of the unit be lifted out of the ground to put the machine on its transport wheels and into a non-operational position so a turn can be made more easily and without tearing up the ground. The process of lifting this type of machine into the transport position is accomplished only with a substantial amount of operator effort.

U.S. Pat. No. 6,102,129 to Classen discloses a turf aerator with two separate tine shaft halves that are driven by two separate drive mechanisms that must be operated either simultaneously or independently of one another. The disclosed aerator provides only for two alternative conditions with regard to the rotation of the tine shaft halves. Either the two tine shaft halves rotate simultaneously at the same rotational speed or the rotation of one of the tine shaft halves is stopped while the other tine shaft half continues to rotate, causing the aerator to turn in the direction of the stopped tine shaft half. The invention does not allow for the two tine shaft halves to rotate at different speeds relative to each other.

Operators complain that such machines are difficult to turn smoothly and unnecessary damage to the turf occurs because the tine shafts are in either a rotating or stopped configuration in these machines. Further, the drive rollers on these machines exhibit a sliding motion on the turf, resulting in unnecessary damage to the grass because the rotation of the roller on the inside of the turn must be stopped while the outside roller continues to rotate. Additionally, such machines currently have a single drive chain, located on either the right or left side of the machine with one side connected to the drum and the other side not connected to the drum, making it more difficult to turn in one direction than the other.

Current machines also require the addition of water in the drive rollers or other weighting methods to ensure that the machine is heavy enough for the tines to penetrate the turf. Present machines also require substantial effort and disassembly to service or change drive belts because the drive and reduction shafts must be removed to free the drive belt. Finally, operators often complain about the difficulty in changing current machines from the operational position, with the tines engaged in the turf, to the non-operational, transport position where the tines are elevated and the machine is positioned on transport wheels.

The present invention solves these problems.

SUMMARY OF THE INVENTION

An aerator that allows the operator to make a turn with the machine while the tines are still in contact with the turf through the use of a differential and brakes that enhance the maneuverability of the machine. The aerator is fitted with a mechanical gear type differential on an intermediate drive shaft that provides for automatic, separate and variable rotational motion of the individual halves of the tine shaft. This differential apparatus also provides constant and equal torque application to both sides of the tine wheel assembly simultaneously while the machine is operating. This insures that tine penetration into the turf is equal on both sides at all times. The tine shaft halves are designed and mounted in such manner as to allow each half (left and right sides) to be driven by separate chains from the differential shaft. This design results in a desired variation in the speed of rotation of the two halves that facilitates in turning the unit. The differential mechanism is also functional in driving the transport drive rollers at the front of the machine. The improved aerator is also fitted with brakes installed on each side of the unit, which can selectively reduce the speed of rotation of the separate tine wheel halves as well as the individual drive rollers on the front of the unit, thus increasing the steering efficiency.

The new aerator also includes a spring-actuated lift assist to help the operator raise the unit into the transport position. This mechanism consists of heavy duty springs on both sides of the unit to apply equal forces to both of the transport wheel lift members. A release mechanism operated from the handle bar is provided to allow the operator to disengage the retaining latches, which will allow these springs to pull the transport wheels forward and under the unit thus raising the tine shaft out of the turf. The aerator also incorporates drive rollers of sufficient mass such that the addition of water or other additional weighting methods is not required.

An object and advantage of the invention is to provide a powered walk-behind aerator with enhanced maneuverability and ease of operation by providing automatic, selective and variable power to each aerator tine shaft half and each drive roller.

Another object and advantage of the invention is to provide a powered walk-behind aerator with enhanced maneuverability due to the use of brakes that assist with the steering of the aerator.

Another object and advantage of the invention is to provide a powered walk-behind aerator with enhanced maneuverability during the aeration operation by providing selective power to each tine shaft half via two easily accessible drive chains from a differential shaft.

A further object and advantage of the invention is to provide a powered walk-behind aerator with enhanced maneuverability during both the aeration operation and transport by providing selective power to each drive roller via two drive chains from a differential shaft.

Another object and advantage of the invention is to provide a powered walk-behind aerator that reduces the amount of turf damage by minimizing the slipping or skidding of the drive rollers during the turning operation.

Yet another object and advantage of the invention is to provide a novel spring-assisted lifting mechanism for easily adjusting the aerator from an operative position wherein the aerator tines are positioned to allow engagement with the turf to a transport position wherein the aerator is in an inoperative position with the aerator tines raised to prevent engagement with the turf.

A further object and advantage of the invention is to provide a self-propelled aerator with drive rollers that do not require the addition of water or other weights in order to ensure the aerator tines penetrate the ground effectively.

Another object and advantage of the invention is to provide a method of manufacturing drive rollers from a suitable material such that they are of sufficient mass as to eliminate the need to fill the drums with water to facilitate the penetration of the tines in the ground surface.

Another object and advantage of the invention is to provide a differential shaft that includes an easily separable coupling, generally in the middle of the shaft, to allow for quick replacement of the drive belt and other maintenance thereon.

Yet another object and advantage is that the present invention substantially reduces the effort needed to lift the machine in order to get the tines out of the ground. Additionally, the present invention allows the operator to make a turn with the machine while the tines are still in contact with the turf through the use of a differential driving mechanism and brakes that enhance the maneuverability of the machine.

An object and advantage is that the present invention is fitted with a mechanical gear type differential on an intermediate drive shaft that provides for automatic, separate and variable rotational motion of the individual halves of the tine shaft. In order to make a turn easily, the tine shaft half on the inner portion of the turn must turn slower than the tine shaft half on the outer portion of the turn. This differential apparatus also provides constant and equal torque application to both sides of tine wheel assembly simultaneously while the machine is operating. This insures that tine penetration into the turf is equal on both sides at all times. The tine shaft halves are designed and mounted in such manner as to allow each half (left and right sides) to be driven by separate chains from the differential shaft. This design results in a desired variation in the speed of rotation of the two halves that facilitates turning the unit.

Another object and advantage is that the differential mechanism is also functional in driving the transport rollers at the front of the machine. During turns, whether aerating or transporting, the differential will automatically adjust the speeds of the roller segments to match the desired rotational speeds, which will limit the amount of sliding action on the turf thus reducing turf damage while making it easier for the operator to make these turns.

Yet another object and advantage is that the present invention is fitted with brakes installed on each side of the unit, which the operator can actuate to reduce the speed of rotation of the separate tine shaft halves and the individual drive rollers on the front of the unit, thus increasing the steering efficiency. This reduction in speed of rotation of the tine shaft halves and drive rollers allows the machine to make turns at a more reasonable speed because the tine shaft half on the inner aspect of the turn will slow down. The differential aspect of the invention occurs automatically in response to changes in terrain or pressure provided on the machine steering handle in a given direction by the operator. The steering operation may be assisted by the operator by means of dual control brakes located on the operational handle which are engaged as needed to make a turn to the right or to the left. The brakes can be band, disc, or other equivalent designs to effectively allow the operator to slow the rotational speed of one side of the differential shaft which drives the tine shaft halves and drive rollers to enhance the turning operation, thus allowing for smoother turns while limiting turf damage.

Another object and advantage is that the power to the tines and rollers can be quickly engaged and disengaged by activating or releasing the main drive clutch, which is controlled by the operator at the operational handle. This clutch is a simple idler pulley designed to engage the outer surface of the 'V' belt when the operator actuates the clutch by pulling the operational handle towards the steering handle, thus tightening the belt around the engine power take-off pulley and the differential shaft pulley, causing the differential shaft to rotate.

Yet another object and advantage is that rolling aerators, such as being described herein, must have sufficient overall weight to penetrate the turf. The present invention accomplishes this, in part, through uniquely designed molded drums that do not require the addition of water to obtain the proper weight as is required with current aerators. The present invention also eliminates the need to load the aerator with additional weights or ballast thus providing superior handling and maneuverability.

Another object and advantage is that the present invention is equipped with a spring-actuated lift assist to help the operator raise the unit into the transport position. The present invention includes heavy duty springs on both sides of the unit to apply equal forces to both of the transport wheel lift members. A release mechanism operated from the handle bar is provided to allow the operator to disengage the retaining latches, which will allow these springs to pull the transport wheels forward and under the unit thus raising the tine shaft halves.

The foregoing objects and advantages of the invention will become apparent to those skilled in the art when the following detailed description of the invention is read in conjunction with the accompanying drawings and claims. Throughout the drawings, like numerals refer to similar or identical parts.

BRIEF DESCRIPTION OF THE DRAWINGS

FIG. 9 is an elevational view of the aerator with the housing removed.

FIG. 10 is a plan view of the aerator with the housing removed.

DETAILED DESCRIPTION OF THE INVENTION

With reference to the accompanying figures, there is provided a method and apparatus for an aerator with differential steering, brake-assisted steering and power-assisted lifting.

Figure 1:
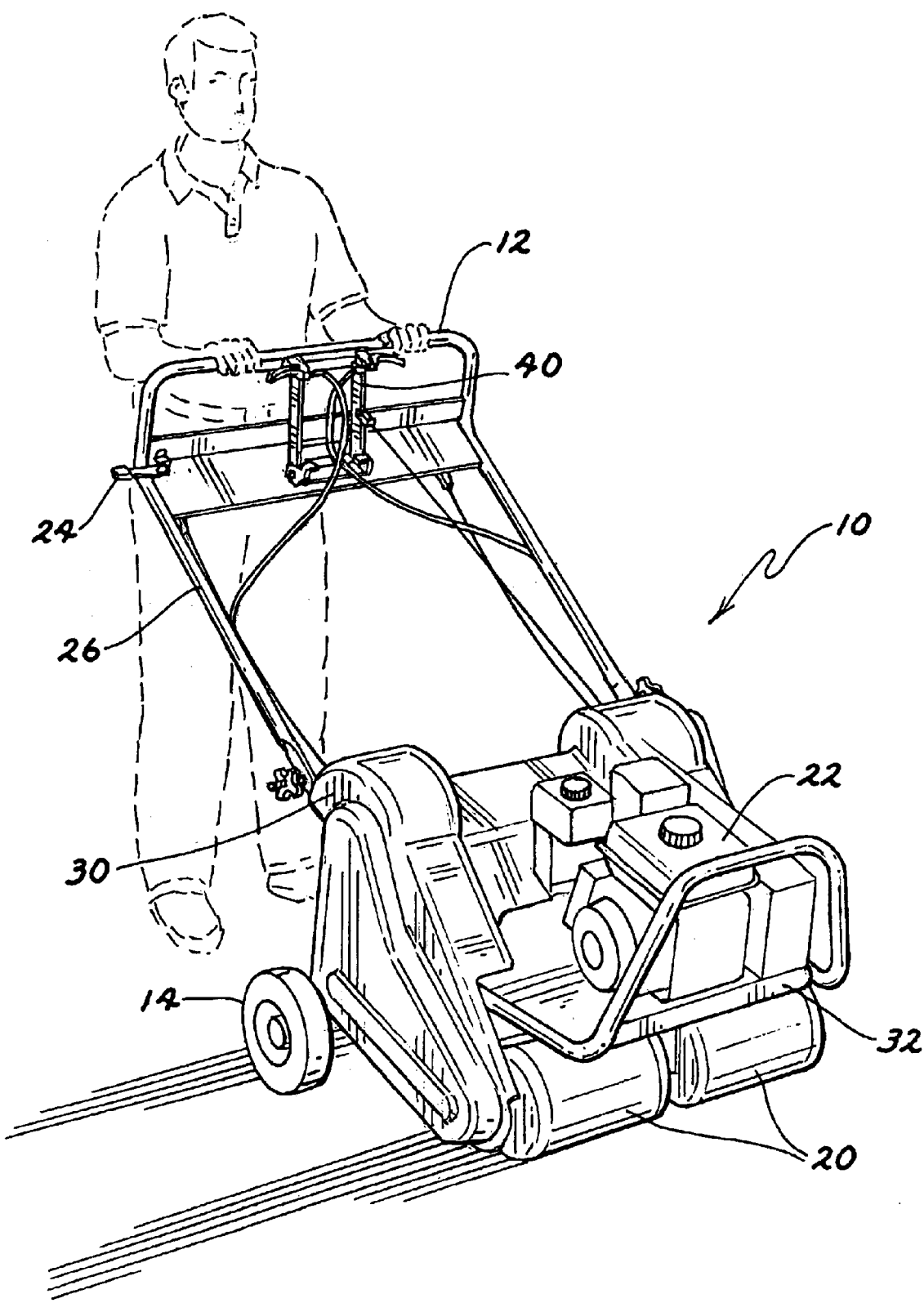
FIG. 1 is a front perspective view that shows the aerator configured in the transport position.
Figure 2:
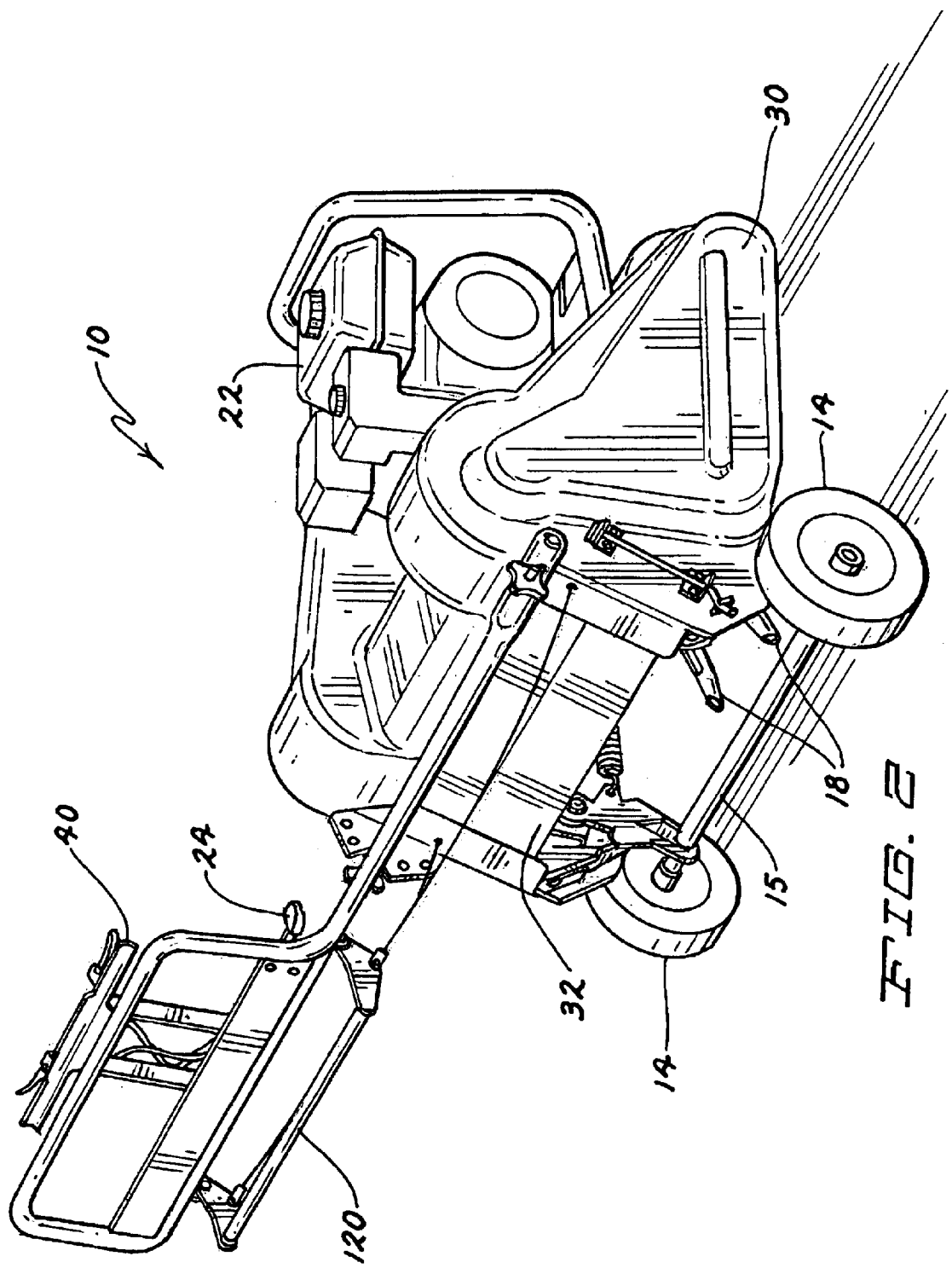
FIG. 2 is a rear perspective view of the aerator configured in the transport position.

FIGS. 1 and 2 illustrate the aerator (10) configured in the transport position with the operator's hands in phantom on the steering handle (12). The transport position configuration consists of the transport wheels (14) being rotated forward and underneath the frame (32) of the aerator as shown in perspective in FIG. 2. The aerator consists further of two tine shafts (16), visible in phantom in FIG. 10, and two drive rollers (20) visible in FIG. 1. FIGS. 2, 9 and 10 illustrate the plurality of tines (18) that are mounted on each tine half shaft (47) for the purpose of penetrating the turf and extracting soil plugs. The aerator is powered by an engine (22). Engine speed is controlled by actuation of the throttle control (24) and associated throttle cable (26), both visible in FIGS. 1–3, which connects the throttle control (24) to the engine (22). FIG. 2 shows the transport wheels (14) rotationally mounted to the transport wheel axle (15). The housing (30) protects the interior from dust and debris and acts as a safety medium to prevent accidental operator contact with moving parts.

Referring now to FIGS. 9 and 10, the aerator (10) is equipped with an enhanced steering assembly (34). The steering assembly (34) consists of a differential assembly (35), a drive assembly (36), a clutching assembly (37), and a braking assembly (38).

The differential assembly (35) consists of a differential shaft (42), which comprises a left differential shaft (44) and a right differential shaft (46). The right differential shaft (46) is removably connected to the left differential shaft (44) by a differential coupling (45). The differential coupling (45) allows the two differential shaft sections to be separated for maintenance purposes.

The drive assembly (36) is comprised of two groups of sprockets that are each operationally engaged by a drive chain (80) and are located on opposite sides of the frame (32). Differential sprockets (84) are operationally connected to the left differential shaft (44) and the right differential shaft (46). Tine shaft sprockets (86) are operationally connected to the left tine shaft half (48) and the right tine shaft half (50), respectively. Roller sprockets (88) are operatively connected to the left roller (52) and the right roller (54), respectively. Finally, a tensioning sprocket (90) is rotationally connected to the frame (32). Drive chains (80) engage each set of sprockets.

The clutching assembly (37) comprises a 'V' belt (60) with an inner surface (62) and an outer surface (64). The power take-off pulley (68) is operationally mounted on the power take-off shaft (66) of the engine (22). A differential shaft pulley (70) is operationally mounted on the differential shaft (42). The inner surface of the 'V' belt (62) is capable of engaging the power take-off pulley (68) and the differential shaft pulley (70). The clutching assembly is controlled by actuation of the operational handle (40). One end of the clutch control tension cable (76) is connected to the operational handle (40) and the other end of the clutch control tension cable (76) is connected to the clutch actuation lever (74). The clutch actuation lever (74) is rotationally mounted to the frame (32) and is capable, when actuated, of causing the clutch idler pulley (72) to rotate essentially vertically to engage the outer surface of the 'V' belt (64). This causes the transference of rotational power from the power take-off shaft (66) to the differential shaft (42)

Figure 3:
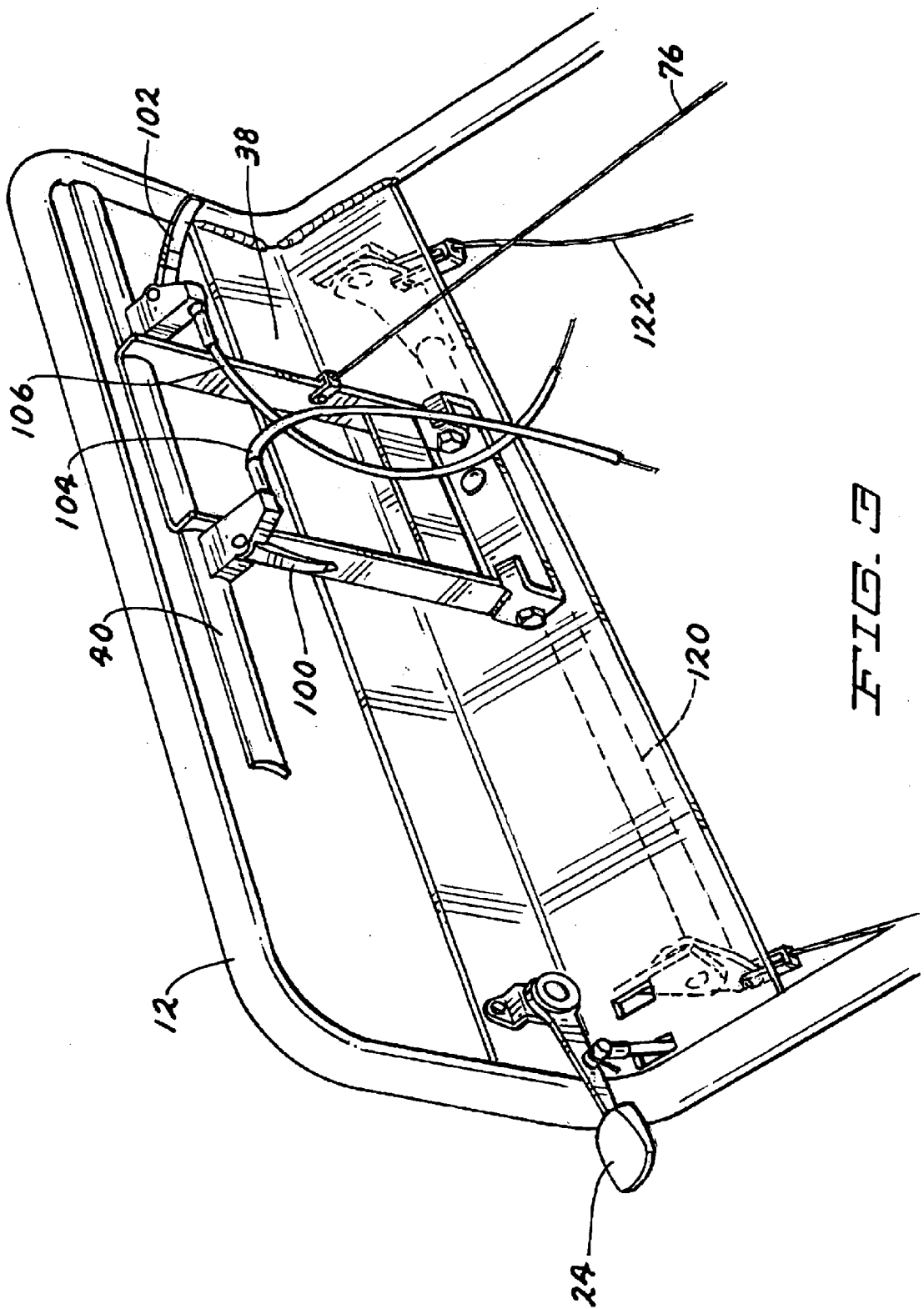
FIG. 3 is a broken away view that shows the aerator handle and associated cabling and controls.

Finally, the braking assembly (38) is comprised of the right brake lever (100) and the left brake lever (102) mounted on the operational handle (40). The right brake lever (100) is connected to the right brake (108) by the right brake cable (104) as illustrated in FIG. 3. The left brake lever (102) is connected to the left brake (110) by the left brake cable (106). Referring now to FIG. 10, the right brake (108) is shown operationally mounted on the right differential shaft (46) and the left brake (110) is shown operationally mounted on the left differential shaft (44). The brakes are capable of selectively slowing the rotational speed of the right and left differential shafts. An alternate embodiment, not shown in the Figures, includes rigid brake hand guards, commonly found on BMX bicycles, 4-wheel all-terrain vehicles and off-road motorcycles. The hand guards may be manufactured from any rigid material, for example, high density polyethylene (HDPE), other similar material or metal. The guards are preferably mounted on the operational handle (40) in front of the brake levers in such a manner as to protect the operator's hands and fingers from oncoming tree limbs and brush. The metal guard may also be mounted to the steering handle and loop in front of the brake levers.

Figure 4:
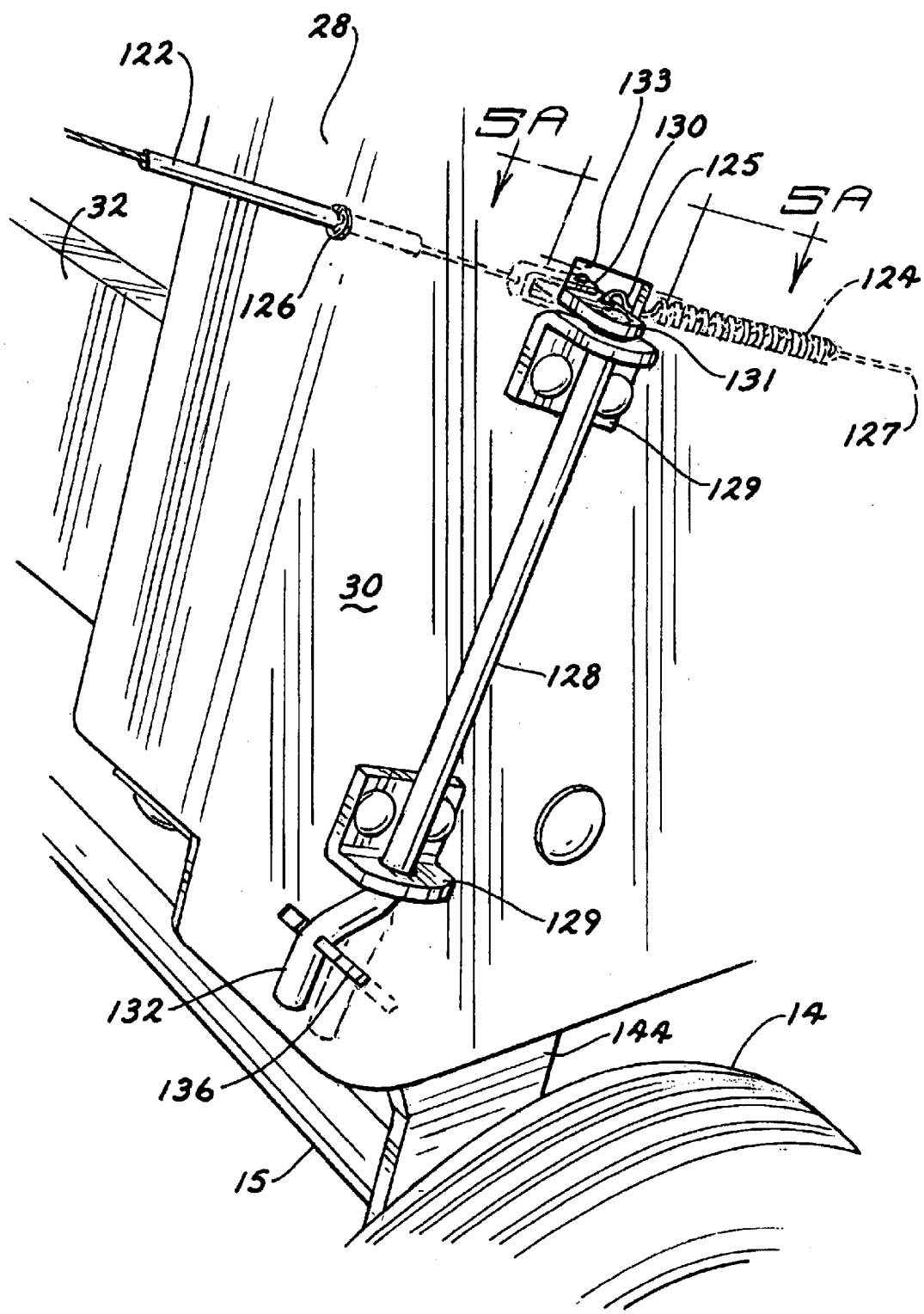
FIG. 4 shows is a broken away view that shows the lift actuation bar and its engagement with the locking latch.

The spring-assisted lifting mechanism will now be described. The lift cable (122) is connected at one end to the lift handle (120) as shown in FIGS. 2 and 3. Turning now to FIGS. 3–8B, the lift cable (122) is shown in FIGS. 3, 7A and 7B as it enters the housing (30) through an aperture (126) to connect with one side of the lift actuation bracket (130). The first end (125) of the lift actuation bias spring (124) is connected to the other side of the lift actuation bracket (130). The second end (127) of the lift actuation bias spring (124) is attached to the frame (32). The lift actuation bracket (130) is attached by a bolt or other well-known method to the upper lift actuation lever (131). The upper lift actuation lever (131) is disposed through a housing aperture (133) and is fixedly attached to the lift actuation bar (128). The lift actuation bar (128) is rotationally mounted to the housing (30) by attachments (129), which provide free lateral rotational movement but restrict vertical movement. The attachments (129) are shown as upper and lower brackets fixedly attached to the housing (30). The lift actuation bar (128)

further comprises a lower lift actuation lever (132), which is angled as shown in FIG. 4. The lower lift actuation lever (132) is captured by the 'U' shaped locking latch tab (136). The locking latch tab (136) extends through an aperture (137) in the housing. It is to be understood that the locking latch tab (136) may be any shape that captures the lower lift actuation lever (132). FIGS. 4, 7A and 7B indicate the relationship between the locking latch (134) and the lift actuation bar (128).

Figure 6:
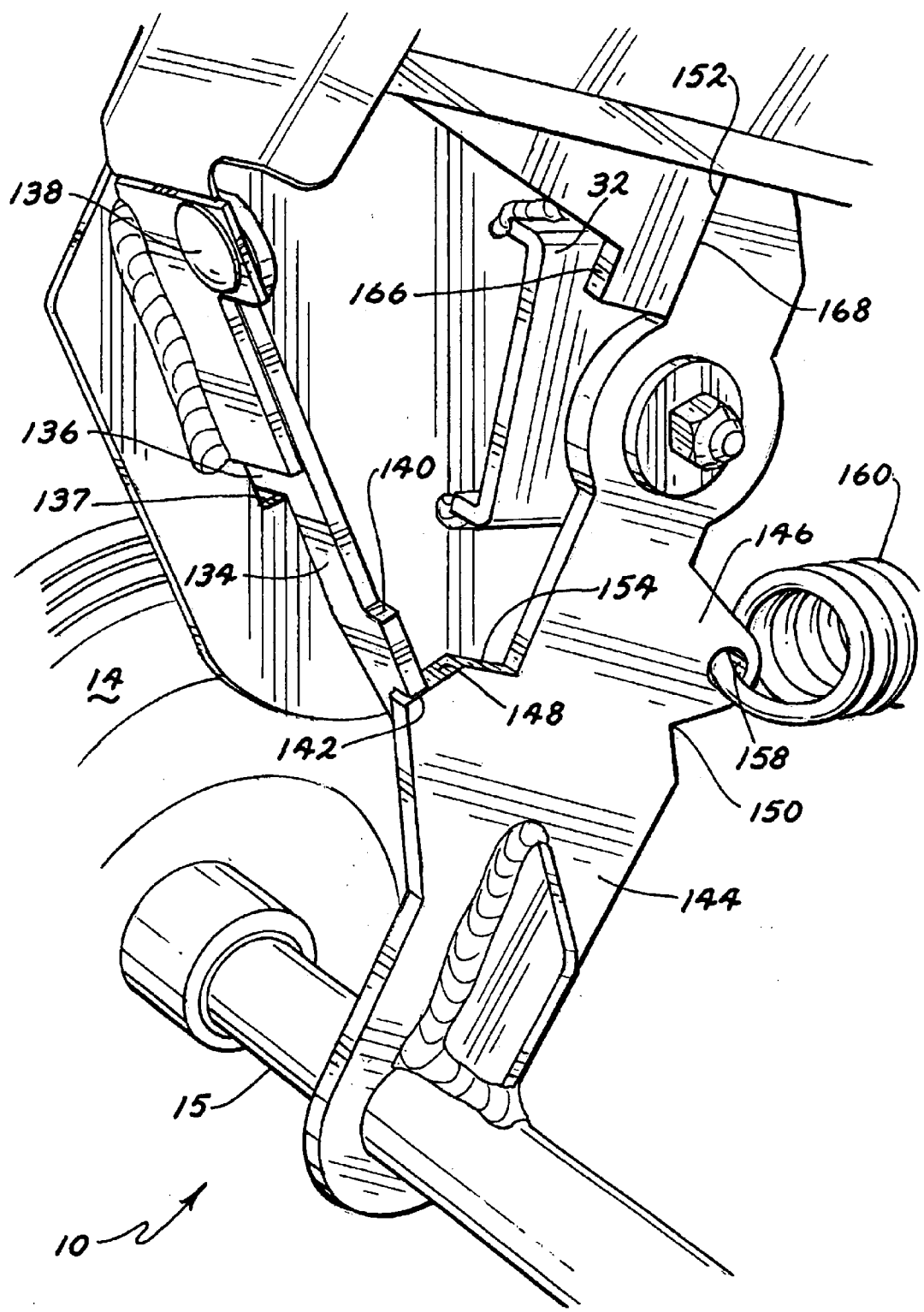
FIG. 6 is a broken away view of the spring-assisted lifting mechanism in the transport position.
Figure 7A:
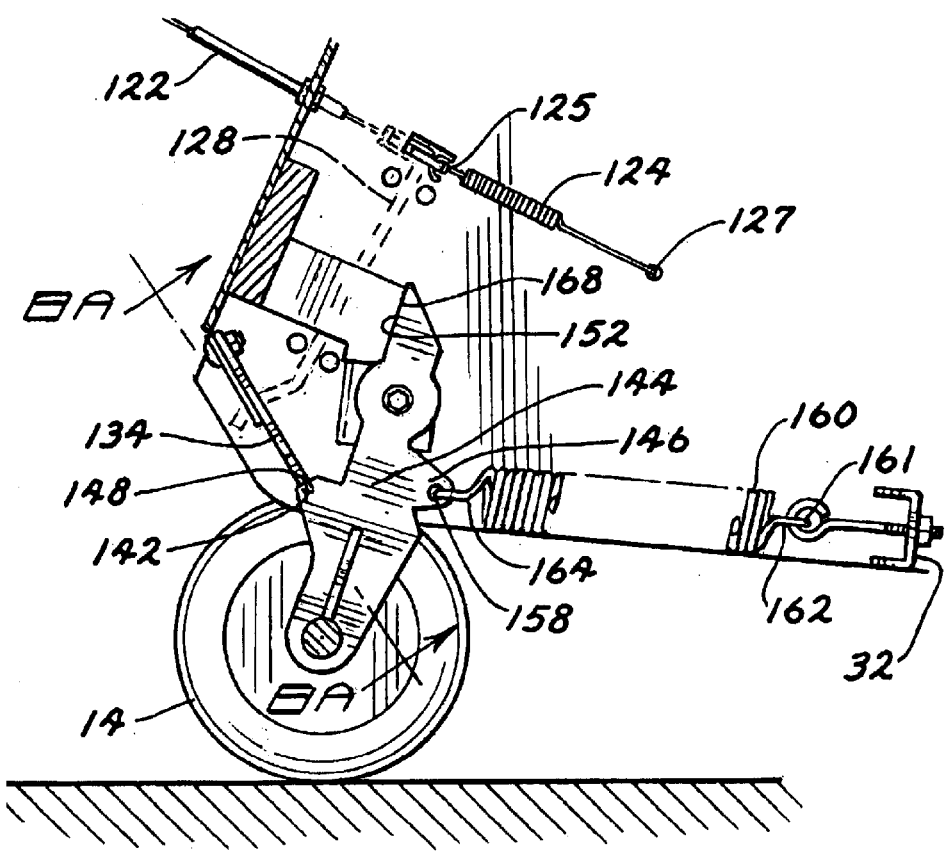
FIG. 7A is a broken away view that illustrates the spring-assisted lifting mechanism in the transport position.
Figure 7B:
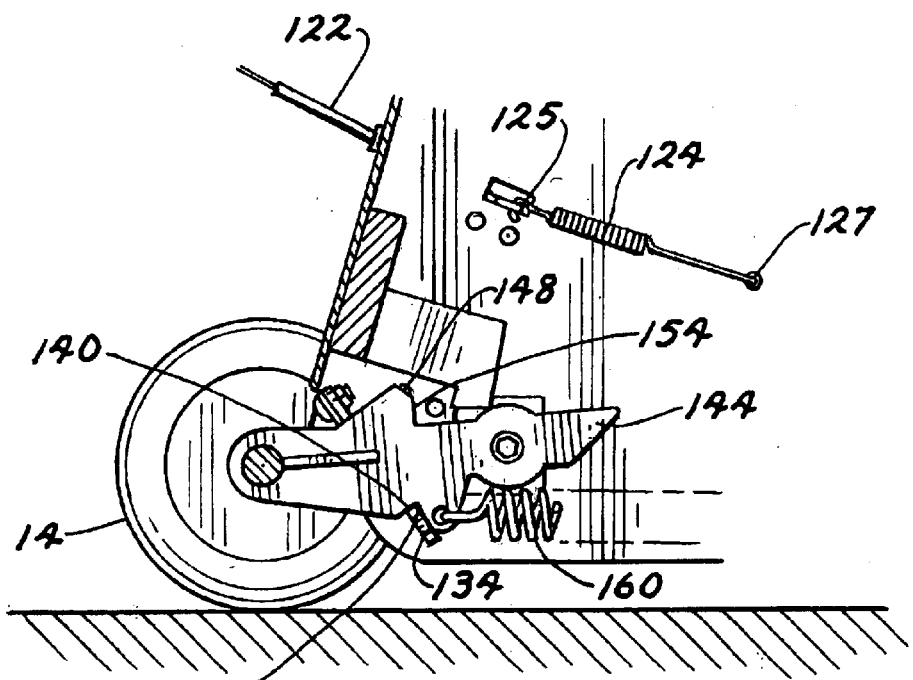
FIG. 7B is a broken away view that illustrates the spring-assisted lifting mechanism in the operational position.
Figure 8A:
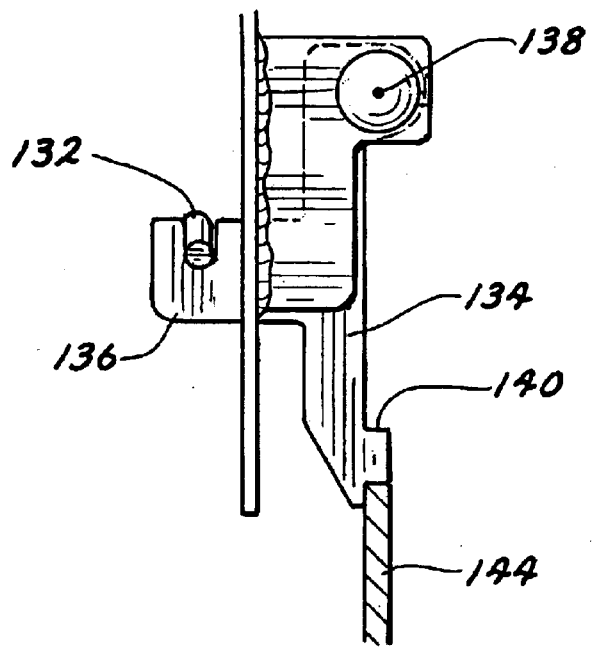
FIG. 8A is a broken away view that shows the locking latch in the locked position.
Figure 8B:
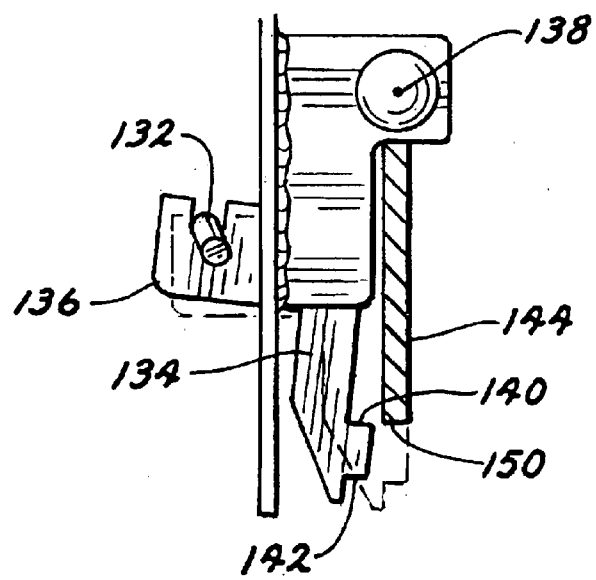
FIG. 8B is a broken away view that shows the locking latch in the unlocked position.
Figure 11:
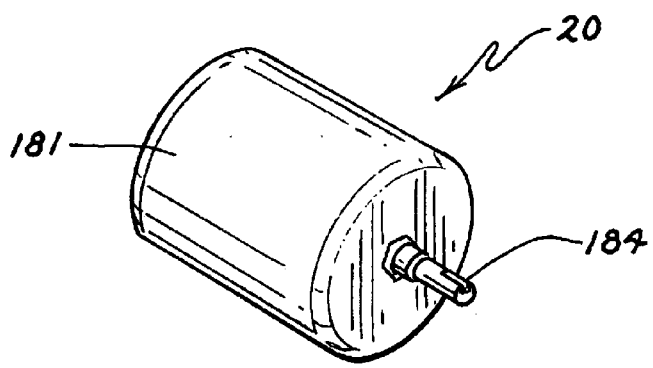
FIG. 11 is a perspective view of the molded roller drum.
Figure 12:
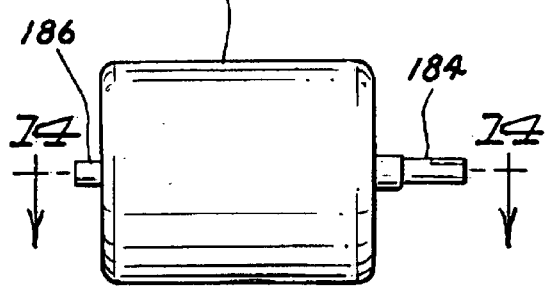
FIG. 12 is a front side elevational view of the roller drum and shaft.
Figure 13:
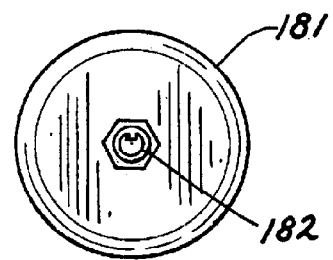
FIG. 13 is an elevational view of the roller drum and shaft.
Figure 14:
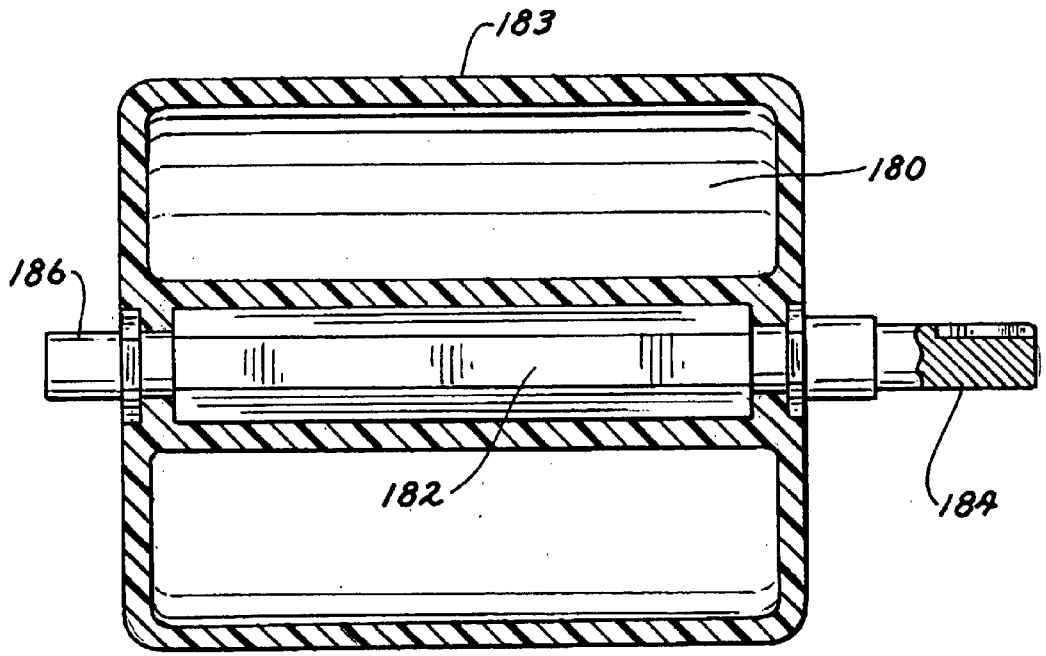
FIG. 14 is a cross sectional view of the roller drum and shaft.

As illustrated in FIG. 6, the locking latch (136) is rotationally mounted to the frame (32) using a bolt (138) or other suitable means and is further comprised of an upper lip (140) and a lower lip (142). A lift bracket (144) is fixedly attached to the transport wheel axle (15). The lift bracket (144) includes a step (148), which is shown in FIGS. 6 and 7A as engaging the lower lip of the locking latch (142) when the aerator is in the transport position. The lift bracket (144) further includes an ear (146), a recessed notch (150), a transport position stop (152) and an operational position stop (154). FIG. 7B illustrates the locking latch upper lip (140) engaged with the lift bracket recessed notch (150) when the aerator is in the operational position. The first end (164) of the lift spring (160) is shown in FIG. 7A engaging an aperture (158) disposed in the lift bracket ear (146). The second end (162) of the lift spring (160) is fixedly attached via an eye bolt (161) to the frame (32).

Turning to FIGS. 11–14, the roller drums (20) are molded components consisting of the drum portion (181) and a continuous shaft portion (182) that is incorporated therein. The exterior ends of the shafts (184) are operatively connected to the roller sprockets (88), which are, in turn, operatively engaged by the drive chains (80). The interior ends of the shaft (186) are rotatably connected to bearings (188) mounted on the frame (32). The molded roller drums (20) have a substantially hollow interior (180) with the thickness of the sides of the drum (183) designed to allow the weight of the drum (20) to be sufficient to ensure that the tines (18) of the aerator (10) are fully engaged with the turf when the aerator (10) is in the operational position. The interior hollow of the drum may or may not coat the entire outer surface of the portion of the shaft (182) that is covered by the drum material (183). The drums (20) in the preferred embodiment are manufactured from High Density Polyethylene HDPE. It is understood that any other similar known material may be utilized to achieve the desired result.

Operation of the preferred embodiment may now be described.

The locking latch upper lip (140) is locked and engaged with the lift bracket recessed notch (150) when the aerator is in the operational position, wherein the transport wheels (14) are rotated back and the frame lowered allowing the tines (18) to penetrate the turf. This configuration is shown in FIG. 7B. Powered transportation of the aerator (10) is accomplished using the transport wheels (14) and the powered rollers (20) and requires transforming the aerator (10) from the operational position to the transport position.

The aerator is in the operational position when the transport wheels (14) are rotated back and the frame (32) is lowered with respect to the transport wheels (14) allowing the tines (18) to engage the turf. In this position, the lift bracket (144) has rotated, against the lift spring (160) bias, until the locking latch upper lip (140) is engaged and locked with the lift bracket recessed notch (150) and the lift bracket operational stop (154) is engaged with the operational stop bracket (166).

Figure 5A:
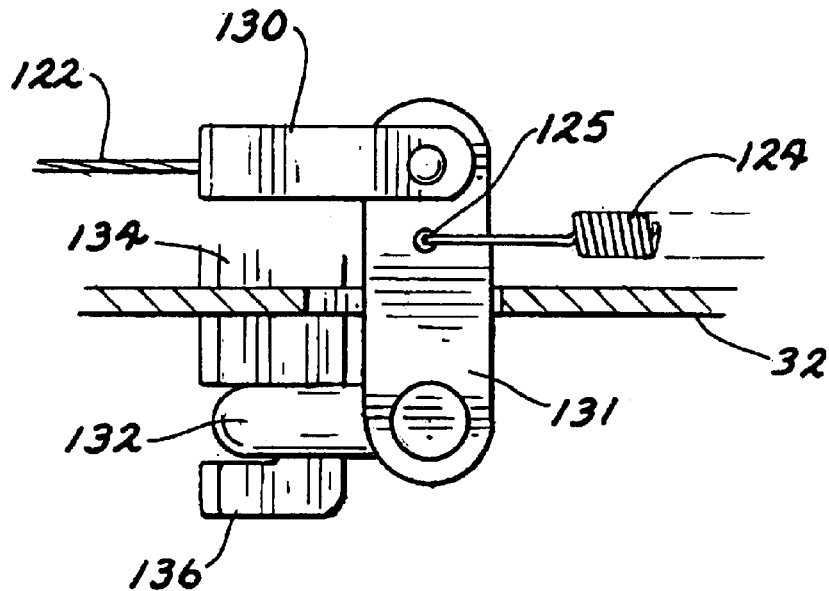
FIG. 5A is a top broken away view of the lift actuation bar and locking latch in the locked position.
Figure 5B:
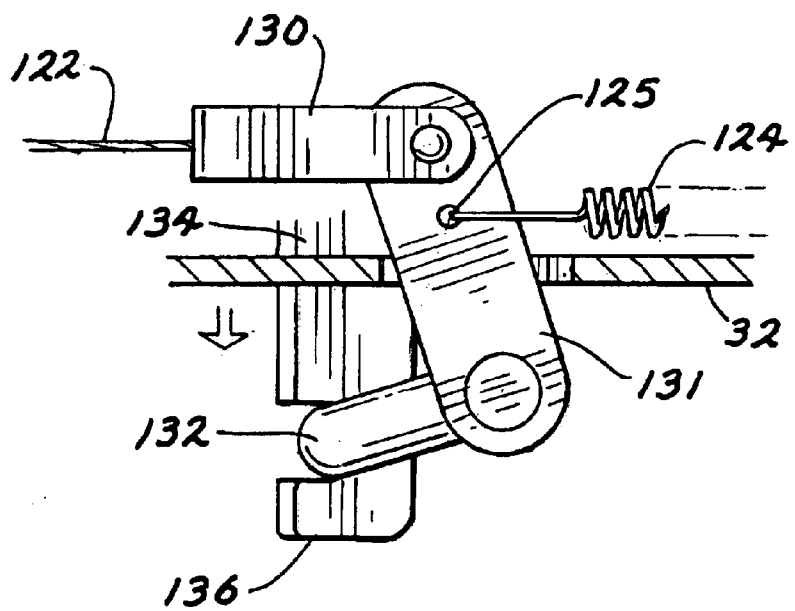
FIG. 5B is a top broken away view of the lift actuation bar and locking latch in the unlocked position.

The transport position is achieved by pulling the lift handle (120), which increases the tension on the lift cable (122). The lift cable (122) increases tension on the lift actuation bracket (130), eventually overcoming the bias of the lift actuation bias spring (124), placing rotational pressure on the upper lift actuation lever (131) and, ultimately, resulting in lateral rotation of the lift actuation bar (128). Due to its angled profile, the lower lift actuation lever (132) is caused to rotate outwardly laterally away from the housing (30). The motion of the lower lift actuation lever (132) is transmitted to the locking latch (134), which captures the lower lift actuation lever (132) via a 'U' shaped tab (136). Thus, as the lower lift actuation lever (132) rotates laterally, the 'U' shaped tab on the locking latch (136) is caused to rotate laterally through the tab aperture (137), which is visible in FIG. 6. FIG. 5A is a top fragmented view, which illustrates the locking latch (134) being held in the locked position by the lift actuation bias spring (124). This configuration corresponds to the transport position, with the transport wheels (14) rotated downward and underneath the aerator (10). FIG. 5B is a top fragmented view, which illustrates the locking latch (134) in the unlocked position. The bias of the lift actuation spring (124) is shown in FIG. 5B as having been overcome by increased tension of the lift cable (120), allowing the lift actuation bar (128) to rotate laterally. The 'U' shaped tab of the locking latch (136) is shown fully extended rotationally laterally through the housing aperture (137), visible in FIG. 6.

The lateral rotation of the locking latch results in the disengagement of the locking latch upper lip (140) from the lift bracket recessed notch (150). The operator then lifts the steering handle (12) upward, with the assistance of the lift springs' (160) bias, causing the lift bracket operational stop (152) to disengage from the operational stop bracket (166). The lifting operation continues until the locking latch lower lip (142) engages and locks the lift bracket step (148) and the lift bracket transport stop (152) engages the transport stop bracket (168). Concomitantly, the transport wheels (15) are caused to rotate forward and to move underneath the aerator frame (32) resulting in the aerator rising vertically with respect to the transport wheel axle (15) so that the tines (18) are disengaged from the turf. The machine (10) is now locked in the transport position with the tines (18) raised above the ground.

The aerator (10) may now be moved by simply pushing it or by engaging the drive rollers (20) to power drive the aerator (10). To engage the drive rollers (20), the operator pulls the operational handle (40) back towards the steering handle (12), which results in the clutch control cable (76) causing the clutch actuation lever (74) to pivot upward, moving the clutch idler pulley (72) essentially vertically upward. When fully actuated, the clutch idler pulley (72) engages the outer surface of the 'V' belt (64). This engagement results in a tensioning the of the 'V' belt (60) allowing the inner surface of belt (62) to fully engage the power take-off shaft pulley (68) and the differential shaft pulley (70). The rotation of the power take-off pulley (68) is transferred through the 'V' belt (60) to the differential shaft (42). The rotation of the differential shaft (42) is transferred to a differential shaft sprocket (84) mounted on the exterior portion of the frame (32). A pair of drive chains (80) each engage a differential sprocket (84) as well as a tine shaft half sprocket (86), a roller sprocket (88) and a tensioning sprocket (90). In the transport position, the tine shaft halves (47) rotate but do not engage the ground. The rollers (20) do, however, remain in contact with the ground. The rollers (20) receive the rotational power transfer from the differential shaft (42) via the drive chain (80) and sprocketing system (82). Thus, the aerator (10) is powered for walk-behind transport. It is understood that in an alternate embodiment, the differential shaft (42) could be operatively connected to the tine half shafts (47) and not to the rollers (20). In this alternate embodiment, the operator could then simply push the aerator (10) forward on its transport wheels (14) and rollers (20) when it is configured in the transport position.

The operator has full control of the speed of the rotation of each roller drum (52, 54) when in the transport mode through use of the throttle (24), which increases the relative speed of the engine power take-off shaft (66), as well as with the right (100) and left (102) brake handles. The right brake (108) and left brake (110) control the speed of the right roller (54) and the left roller (52), respectively, as well as the right tine half shaft (50) and left tine half shaft (48), respectively, which continue to rotate in the transport position, by selectively slowing the differential rotation.

Turns are accomplished by simply engaging the brake on the side to which the turn is desired to be made. A right hand turn is initiated by engaging the right hand brake (108) by actuating the right brake handle (100). This slows the right differential shaft portion (46), thus slowing the right roller (54) and right tine shaft half (50), causing the aerator (10) to turn to the right. A left hand turn is initiated by engaging the left hand brake (110) by actuating the left brake handle (102). This slows the left differential shaft portion (44), thus slowing the left roller (52) and left tine shaft half (48), causing the aerator (10) to turn to the left.

Because of the presence of the differential shaft (42), turns may also be accomplished by the operator simply applying directional pressure to the steering handle (12). For example, applying directional pressure to the right side of the steering handle (12) results in the slowing of rotation of the left roller (52) and left tine half shaft (48) and a concomitant increase of rotation of the right roller (54) and right tine half shaft (50), causing the aerator (10) to turn to the left. The greater the directional force applied by the operator, the sharper the turn made by the aerator (10). Finally, the operator may influence the turning operation by either increasing or decreasing the engine speed of rotation using the throttle control (24). Increasing the engine speed of rotation increases the differential shaft (42) rotational speed and increases the turning speed while decreasing the engine speed decreases the differential shaft (42) rotational speed and decreases the turning speed.

Thus, the operator may initiate and control the turning operation by either increasing or decreasing the engine speed of rotation using the throttle (24) or by selectively increasing or decreasing the respective differential shaft halves (44, 46) rotational speed through use of the brakes (108, 110) or by applying directional force to the steering handle (12), or any combination thereof. As a result, with this particular design the input effort required by the operator to turn the unit can be varied, depending on land terrain, obstacles, the operator's preferences, and his or her physical abilities.

The inventive design provides important safety features for the operator. Application of pressure to both brake handles (100, 102) at the same time, will effectively act as a braking means to stop the forward motion of the aerator (10) quickly. Additionally, the operator may disengage the clutch idler pulley (72) by allowing the operational handle (40) to release forward. This disengages the clutch idler pulley (72) from the 'V' belt (60), causing the differential shaft (42) to stop rotating. As a result, the tine shaft halves (47) and the rollers (20) stop rotating.

Changing the aerator (10) from the transport position into the operational position, wherein the tines (18) are engaged in the turf, requires actuation of the lift handle (120) to increase the tension on the lift cable (122). When the tension on the lift cable (122) is sufficiently great, the cable (122) acts to disengage the locking latch upper lip (140) from the lift bracket step (148). The operator then pushes downward on the steering handle (12), against the bias of the lift springs (160), causing the lift bracket transport stop (152) to disengage from the transport stop bracket (168) and the transport wheels (14) to rotate backward and allowing the frame (32) to lower vertically with respect to the transport wheel axle (15). The aerator (10) is in the operational position when the lower lip of the locking latch (142) engages the lift bracket recessed notch (150) and the lift bracket operational stop (154) engages the operational stop bracket (166). The tines (18) are now fully engageable with the turf.

Powering the aerator (10) in the operational position is accomplished as described above with regard to the transport position with some differences that will now be described. The operator controls the speed of the right tine shaft half (50) and right roller (54) and the left tine shaft half (48) and left roller (52) with the throttle (24) and with selective use of the right (108) and left (110) brakes or by applying directional force to the steering handle (12). The differential shaft (42) ensures that the right roller (54) rotates at the same speed as the right tine shaft half (50) and the left roller (52) rotates at the same speed as the left tine shaft half (48), thus minimizing or eliminating damage to the turf caused by sliding of the rollers (20). Because turns are accomplished with the tines (18) fully engaged in the ground, there is no need to raise the machine (10) to disengage the tines (18) from the ground to make a turn. The differential rotation of the tine shaft halves (47) and drive rollers (20) eliminates or minimizes any turf damage.

The above specification describes certain preferred embodiments of this invention. This specification is in no way intended to limit the scope of the claims. Other modifications, alterations, or substitutions may now suggest themselves to those skilled in the art, all of which are within the spirit and scope of the present invention. It is therefore intended that the present invention be limited only by the scope of the attached claims below.

What is claimed is:

1. A turf aerator, comprising:
   a) a frame;
   b) an engine mounted on the frame for powering the aerator having a power take-off shaft;
   c) a pair of tine shafts rotatably mounted in the frame, each tine shaft having a plurality of tines thereon for aerating the turf; and
   d) a differential shaft mounted to the frame operatively connected to and clutched with the power take-off shaft and further operatively connected to each tine shaft as to give variable rotation to each tine shaft.

2. The aerator of claim 1, wherein the differential shaft has a left side and a right side and further comprising a hand-actuated brake on each side of the differential shaft to variably control the rotation of the differential shaft and the tine shafts.

3. The aerator of claim 1, further comprising a pair of roller shafts rotatably mounted in the frame with a drive roller on each shaft and each roller shaft being operatively connected to a left side or a right side of the differential shaft, respectively.

4. The aerator of claim 3, wherein the differential shaft's operational connections to the tine shafts and roller shafts are outside the frame for easy servicing.

5. The aerator of claim 1, further comprising a biased lifting assembly mounted to and below the frame for lifting and holding the tines out of the turf to place the aerator in a biased transportation mode from an operational mode.

6. The aerator of claim 3, wherein the drive rollers are molded directly to the roller shafts and wherein the drive rollers and roller shafts are sufficiently massive such that the addition of water to the drive roller, or other weighting method, is not required to facilitate penetration of the tines into the turf.

7. The aerator of claim 1, further comprising:
a steering handle, the steering handle being mounted to the frame;
a pair of brake levers; and
a pair of brake hand guards, the brake levers and hand guards being mounted on the steering handle.

8. The aerator of claim 1, further comprising a differential shaft coupling disposed on the differential shaft, wherein the coupling allows for disassembly of the differential shaft for maintenance and servicing.

9. A turf aerator comprising:
a) a frame;
b) an engine mounted on the frame for powering the aerator having a power take-off shaft;
c) a pair of tine shafts rotatably mounted in the frame, each tine shaft having a plurality of tines thereon for aerating the turf and differentially operatively connected to and clutched with the power take-off shaft as to give variable rotation to each tine shaft; and
d) left side and right side hand-actuated brakes operatively connected to the tine shafts to variably control the rotation of the tine shafts.

10. The aerator for claim 9, further comprising a differential shaft mounted to the frame operatively connected and clutched with the power take-off shaft and operatively connected to each tine shaft.

11. The aerator of claim 10, wherein the differential shaft has a left side and a right side wherein the hand-activated brakes are on each side of the differential shaft to variably control the rotation of the differential shaft and the tine shafts.

12. The aerator of claim 10, further comprising a pair of roller shafts rotatably mounted in the frame with a drive roller on each shaft and each roller shaft being operatively connected to the differential shaft.

13. The aerator of claim 12, wherein the differential shaft's operational connections to the tine shafts and the roller shafts are outside the frame for easy servicing.

14. The aerator of claim 9, further comprising a biased lifting assembly mounted to and below the frame for lifting and holding the tines out of the turf to place the aerator in a biased transportation mode from an operational mode.

15. The aerator of claim 12, wherein the drive rollers are molded directly to the roller shafts and wherein the drive rollers and roller shafts are sufficiently massive such that the addition of water to the drive rollers, or other weighting method, is not required to facilitate penetration of the tines into the turf.

16. The aerator of claim 9, further comprising:
a steering handle, the steering handle being mounted to the frame;
a pair of brake levers; and
a pair of brake hand guards, the brake levers and hand guards being mounted to the steering handle.

17. The aerator of claim 10, further comprising a differential shaft coupling disposed on the differential shaft, wherein the coupling allows for disassembly of the differential shaft for maintenance and servicing.

18. A turf aerator, comprising:
a) a frame;
b) an engine mounted on the frame for powering the aerator having a power take-off shaft;
c) a pair of tine shafts rotatably mounted in the frame, each tine shaft having a plurality of tines thereon for aerating the turf and differentially operatively connected to and clutched with the power take-off shaft as to give variable rotation to each tine shaft; and
d) a pair of roller shafts rotatable mounted in the frame with a drive roller on each shaft and each roller shaft being differentially operatively connected to and clutched with the power take-off shaft as to give variable rotation to each roller.

19. The aerator of claim 18, further comprising a differential shaft mounted to the frame operatively connected and clutched with the power take-off shaft and operatively connected to each tine shaft and each roller shaft.

20. The aerator of claim 19, wherein the differential shaft has a left side and a right side and further comprising a hand-activated brake on each side of the differential shaft to variably control the rotation of the differential shaft, the tine shafts and the roller shafts.

21. The aerator of claim 19, wherein the differential shaft's operational connections to the tine shafts and roller shafts are outside the frame for easy servicing.

22. The aerator of claim 18, further comprising a biased lifting assembly below the frame for lifting and holding the tines out of the turf to place the aerator in a biased transportation mode from an operational mode.

23. The aerator of claim 18, wherein the drive rollers are molded directly to the roller shafts and wherein the drive rollers and roller shafts are sufficiently massive such that the addition of water to the drive rollers, or other weighting method, is not required to facilitate penetration of the tines into the turf.

24. The aerator of claim 18, further comprising:
a steering handle, the steering handle being mounted to the frame;
a pair of brake levers; and
a pair of brake hand guards, the brake levers and hand guards being mounted to the steering handle.

25. The aerator of claim 19, further comprising a differential shaft coupling disposed on the differential shaft, wherein the coupling allows for disassembly of the differential shaft for maintenance and servicing.

26. A turf aerator, comprising:
a) a frame;
b) an engine mounted on the frame for powering the aerator having a power take-off shaft;
c) a pair of tine shafts rotatably mounted in the frame, each tine shaft having a plurality of tines thereon for aerating the turf and differentially operatively connected to and clutched with the power take-off shaft as to give variable rotational to each tine shaft; and
d) a biased lifting assembly with wheels mounted below the frame for lifting and holding the tines out of the turf to place the aerator in the biased transportation mode from an operational mode.

27. The aerator of claim 26, further comprising a differential shaft mounted to the frame operatively connected and clutched with the power take-off shaft and operatively connected to each tine shaft.

28. The aerator of claim 27, wherein the differential shaft has a left side and a right side and further comprising a hand-activated brake on each side of the differential shaft to variably control the rotation of the differential shaft and the tine shafts.

29. The aerator of claim 27, further comprising a pair of roller shafts rotatably mounted in the frame with a drive roller on each shaft and each roller shaft being operatively connected to a left side or a right side of the differential shaft, respectively.

30. The aerator of claim 29, wherein the differential shaft's operational connections to the tine shafts and roller shafts are outside the frame for easy servicing.

31. The aerator of claim 29, wherein the drive rollers are molded directly to the roller shafts and wherein the drive rollers and roller shafts are sufficiently massive such that the addition of water to the drive rollers, or other weighting method, is not required to facilitate penetration of the tines into the turf.

32. The aerator of claim 26, further comprising:
   a steering handle, the steering handle being mounted to the frame;
   a pair of brake levers; and
   a pair of brake hand guards, the brake levers and hand guards being mounted to the steering handle.

33. The aerator of claim 27, further comprising a differential shaft coupling disposed on the differential shaft, wherein the coupling allows for disassembly of the differential shaft for maintenance and servicing.

34. A turf aerator, comprising:
   a) a frame;
   b) an engine mounted on the frame for powering the aerator having a power take-off shaft;
   c) a pair of tine shafts rotatably mounted in the frame, each tine shaft having a plurality of tines thereon for aerating the turf;
   d) a differential shaft with a left side and a right side mounted to the frame operatively connected to and clutched with the power take-off shaft and further operatively connected to each tine shaft as to give variable rotation to each tine shaft;
   e) left side and right side hand-activated brakes on each side of the differential shaft to variably control the rotation of the differential shaft;
   f) a pair of roller shafts rotatably mounted to the frame with a drive roller on each shaft and each roller shaft being operatively connected to the left side or the right side of the differential shaft, respectively, wherein the drive rollers are molded directly to the roller shafts and wherein the drive rollers and roller shafts are sufficiently massive such that the addition of water to the drive rollers, or other weighting method, is not required to facilitate penetration of the tines into the turf;
   g) a biased lifting assembly mounted to and below the frame for lifting and holding the tines out of the turf to place the aerator in a biased transportation mode from an operational mode;
   h) brake levers and brake hand guards, the brake levers and hand guards being mounted on a steering handle, the steering handle being mounted to the frame; and
   i) a differential shaft coupling disposed on the differential shaft, wherein the coupling allows for disassembly of the differential shaft for maintenance and servicing.

35. Method of turning a powered aerator, said method comprising:
   engaging the clutching system, thus transferring power from the engine to the tine shaft and drive rollers such that the aerator is driven forwardly;
   actuating the left brake to slow the rotation of the left side of the differential shaft which slows the rotation of the left tine shaft and left drive roller, causing the aerator to turn to the left with a concomitant increase in the rotational speed of the right tine shaft and the right drive roller; and
   actuating the right brake to slow the rotation of the right side of the differential shaft which slows the rotation of the right tine shaft and right drive roller, causing the aerator to turn to the right with a concomitant increase in the rotational speed of the left tine shaft and left drive roller.

36. The method of claim 35, further comprising:
   applying pressure by the operator on the right side of the steering handle resulting in the slowing of rotation of the left side of the differential shaft which slows the rotation of the left tine shaft and the left drive roller while the rotational speed of the right tine shaft and the right drive roller increase, causing the aerator to turn to the left; and
   applying pressure by the operator on the left side of the steering handle resulting in the slowing of the rotation of the right side of the differential shaft which slows the rotation of the right tine shaft and the right drive roller while the rotational speed of the left tine shaft and the left drive roller increase, causing the aerator to turn to the right.

\* \* \* \* \*

(12) INTER PARTES REEXAMINATION CERTIFICATE (1038th)
United States Patent
Kinkead et al.

(10) Number: US 6,708,773 C1
(45) Certificate Issued: Jan. 23, 2015

(54) METHOD AND APPARATUS FOR AN AERATOR WITH DIFFERENTIAL, STEERING ASSIST AND POWER LIFTING

(75) Inventors: John B. Kinkead, St. Paul, MN (US); Loren F. Hansen, Lincoln, NE (US); Donavon D. Kotula, Apple Valley, MN (US); Thomas E. Isaman, Ham Lake, MN (US); Robert Brophy, Raymond, NE (US)

(73) Assignee: Turfco Mfg., Inc., Blaine, MN (US)

Reexamination Request:
No. 95/001,490, Nov. 16, 2010

Reexamination Certificate for:
Patent No.: 6,708,773
Issued: Mar. 23, 2004
Appl. No.: 10/293,528
Filed: Nov. 12, 2002

(51) Int. Cl.
  *A01B 45/02* (2006.01)
(52) U.S. Cl.
  USPC .............................................. 172/21; 172/42
(58) Field of Classification Search
  USPC ...................................................... 172/21, 42
  See application file for complete search history.

(56) References Cited

To view the complete listing of prior art documents cited during the proceeding for Reexamination Control Number 95/001,490, please refer to the USPTO's public Patent Application Information Retrieval (PAIR) system under the Display References tab.

*Primary Examiner* — Matthew C. Graham

(57) ABSTRACT

An aerator [that] allows the operator to make a turn with the machine while the tines are still in contact with the turf through the use of a differential shaft and brakes that enhance the maneuverability of the machine. The aerator is fitted with a mechanical gear type differential on an intermediate drive shaft that provides for automatic, separate and variable rotational motion of the individual halves of the tine shaft. This differential apparatus also provides constant and equal torque application to both sides of the tine wheel assembly simultaneously while the machine is operating. This insures that tine penetration into the turf is equal on both sides at all times. The tine shaft halves are designed and mounted in such manner as to allow each half (left and right sides) to be driven by separate chains from the differential shaft. This design results in a desired variation in the speed of rotation of the two halves that facilitates turning the unit. The differential mechanism is also functional in driving the transport rollers at the front of the machine. The improved aerator is also fitted with brakes installed on each side of the unit which can reduce the speed of rotation of the separate tine wheel halves and the individual drive rollers on the front of the unit, thus increasing the steering efficiency, and a spring-actuated lift assist to help the operator raise the unit into the transport position. The aerator includes heavy duty springs on both sides of the unit to apply equal forces to both of the transport wheel lift members. A release mechanism operated from the handle bar is provided to allow the operator to disengage the retaining latches, which will allow these springs to pull the transport wheels under the unit thus raising the tine shaft halves. The aerator also incorporates drums of sufficient mass so as to not require the addition of water or other additional weighting methods.

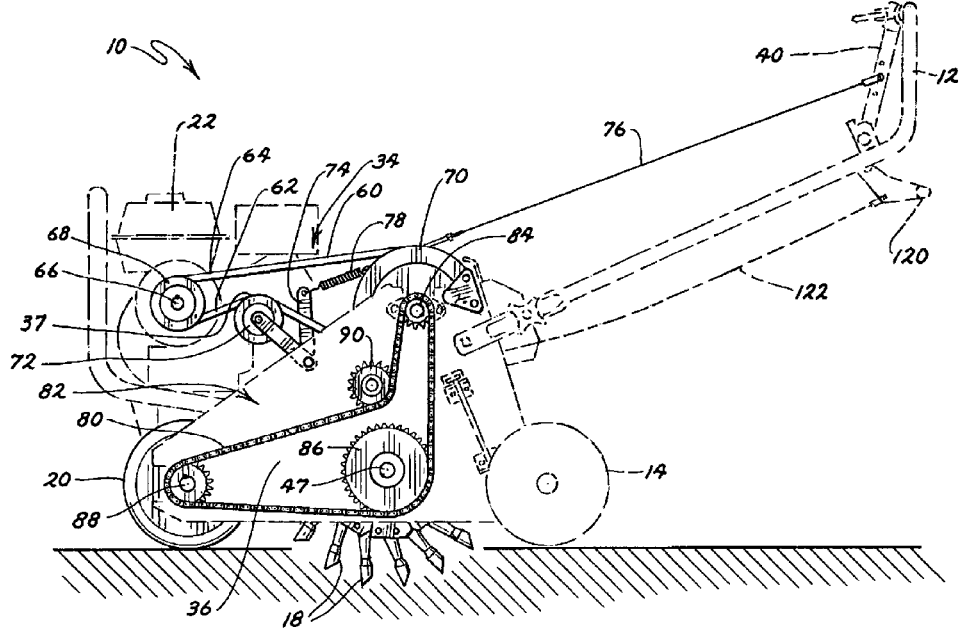

US 6,708,773 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 24-41:

The process of making holes in the turf with current machines is not an easy task, and operators complain about the difficulty in using such units. Making turns with this type of unit is the most difficult part of the operation, because the tines are imbedded into the ground and all of the powered tine wheels in known machines are either rotating at the same speed or the rotation of one half of the tines is completely stopped while the other half of the tines continue to rotate. When the tine wheels of this type of machine are in contact with the ground, it is impossible to make a turn without damaging the turf, which is extremely undesirable in certain sites, such as on golf courses. The damage occurs as a result of the tines tearing the turf and because it is impossible to stop the drive rollers from sliding across the surface of the turf. As a consequence of the embedded tines, the operator must exert a great deal of effort to turn the aerator.

Column 1, lines 49-60:

U.S. Pat. No. 6,102,129 to Classen discloses a turf aerator with two separate tine shaft halves that are driven by two separate drive mechanisms that must be operated either simultaneously or independently of one another. The disclosed aerator provides only for two alternative conditions with regard to the rotation of the tine shaft halves. Either the two tine shaft halves rotate simultaneously at the same rotational speed, or the rotation of one of the tine shaft halves is stopped while the other tine shaft half continues to rotate, causing the aerator to turn in the direction of the stopped tine shaft half. The invention does not allow for the two tine shaft halves to rotate at different speeds relative to each other.

Column 1, line 61 to column 2, line 6:

Operators complain that such machines are difficult to turn smoothly, and unnecessary damage to the turf occurs because the tine shafts are in either a rotating or stopped configuration in these machines. Further, the drive rollers on these machines exhibit a sliding motion on the turf, resulting in unnecessary damage to the grass because the rotation of the roller on the inside of the turn must be stopped while the outside roller continues to rotate. Additionally, such machines currently have a single drive chain, located on either the right or left side of the machine with one side connected to the drum and the other side not connected to the drum, making it more difficult to turn in one direction than the other.

Column 2, lines 7-17:

Current machines also require the addition of water in the drive rollers or other weighting methods to ensure that the machine is heavy enough for the tines to penetrate the turf. Present machines also require substantial effort and disassembly to service or change drive belts, because the drive and reduction shafts must be removed to free the drive belt. Finally, operators often complain about the difficulty in changing current machines from the operational position, with the tines engaged in the turf, to the non-operational, transport position where the tines are elevated and the machine is positioned on transport wheels.

Column 2, lines 21-44:

An aerator [that] allows the operator to make a turn with the machine while the tines are still in contact with the turf through the use of a differential and brakes that enhance the maneuverability of the machine. The aerator is fitted with a mechanical gear type differential on an intermediate drive shaft that provides for automatic, separate and variable rotational motion of the individual halves of the tine shaft. This differential apparatus also provides constant and equal torque application to both sides of the tine wheel assembly simultaneously while the machine is operating. This insures that tine penetration into the turf is equal on both sides at all times. The tine shaft halves are designed and mounted in such manner as to allow each half (left and right sides) to be driven by separate chains from the differential shaft. This design results in a desired variation in the speed of rotation of the two halves that facilitates in turning the unit. The differential mechanism is also functional in driving the transport drive rollers at the front of the machine. The improved aerator is also fitted with brakes installed on each side of the unit, which can selectively reduce the speed of rotation of the separate tine wheel halves as well as the individual drive rollers on the front of the unit, thus increasing the steering efficiency.

Column 6, lines 9-26:

The clutching assembly (37) comprises a 'V' belt (60) with an inner surface (62) and an outer surface (64). The power take-off pulley (68) is operationally mounted on the power take-off shaft (66) of the engine (22). A differential shaft pulley (70) is operationally mounted on the differential shaft (42). The inner surface *(60)* of the 'V' belt [(62)] *(60)* is capable of engaging the power take-off pulley (68) and the differential shaft pulley (70). The clutching assembly is controlled by actuation of the operational handle (40). One end of the clutch control tension cable (76) is connected to the operational handle (40), and the other end of the clutch control tension cable (76) is connected to the clutch actuation lever (74) *through a spring (78)*. The clutch actuation lever (74) is rotationally mounted to the frame (32) and is capable, when actuated, of causing the clutch idler pulley (72) to rotate essentially vertically to engage the outer surface *(64)* of the 'V' belt [(64)] *(60)*. This causes the transference of rotational power from the power take-off shaft (66) to the differential shaft (42).

Column 6, line 49 to column 7, line 9:

The spring-assisted lifting mechanism will now be described. The lift cable (122) is connected at one end to the lift handle (120) as shown in FIGS. 2 and 3. Turning now to FIGS. 3-8B, the lift cable (122) is shown in FIGS. 3, 7A and 7B as it enters *a panel (28) of* the housing (30) through an aperture (126) to connect with one side of the lift actuation bracket (130). The first end (125) of the lift actuation bias spring (124) is connected to the other side of the lift actuation bracket (130). The second end (127) of the lift actuation bias spring (124) is attached to the frame (32). The lift actuation bracket (130) is attached by a bolt or other well-known method to the upper lift actuation lever (131). The upper lift actuation lever (131) is disposed through a housing aperture (133) and is fixedly attached to the lift actuation bar (128). The lift actuation bar (128) is rotationally mounted to the housing (30) by attachments (129), which provide free lateral rotational movement but restrict vertical movement. The attachments (129) are shown as upper and lower brackets fixedly attached to the housing (30). The lift actuation bar (128) further comprises a lower lift actuation lever (132), which is angled as shown in FIG. 4. The lower lift actuation lever (132) is captured by the 'U' shaped locking latch tab (136). The locking latch tab (136) extends through an aperture (137) in the housing. It is to be understood that the locking latch tab (136) may be any shape that captures the lower lift actuation lever (132). FIGS. 4, 7A and 7B indicate the relationship between the locking latch (134) and the lift actuation bar (128).

Column 7, lines 10-26:

As illustrated in FIG. 6, the locking latch (136) is rotationally mounted to the frame (32) using a bolt (138) or other suitable means and is further comprised of an upper lip (140) and a lower lip (142). A lift bracket (144) is fixedly attached to the transport wheel axle (15). The lift bracket (144) includes a step (148), which is shown in FIGS. 6 and 7A as engaging the lower lip *(142)* of the locking latch [(142)] *(134)* when the aerator is in the transport position. The lift bracket (144) further includes an ear (146), a recessed notch (150), a transport position stop (152) and an operational position stop (154). FIG. 7B illustrates the locking latch upper lip (140) engaged with the lift bracket recessed notch (150) when the aerator is in the operational position. The first end (164) of the lift spring (160) is shown in FIG. 7A engaging an aperture (158) disposed in the lift bracket ear (146). The second end (162) of the lift spring (160) is fixedly attached via an eye bolt (161) to the frame (32).

Column 7, lines 27-45:

Turning to FIGS. 11-14, the roller drums (20) are molded components consisting of the drum portion (181) and a continuous shaft portion (182) that is incorporated therein. The exterior ends of the shafts (184) are operatively connected to the roller sprockets (88), which are, in turn, operatively engaged by the drive chains (80). The interior ends of the shaft (186) are rotatably connected to bearings [(188)] mounted on the frame (32). The molded roller drums (20) have a substantially hollow interior (180) with the thickness of the sides of the drum *material* (183) designed to allow the weight of the drum (20) to be sufficient to ensure that the tines (18) of the aerator (10) are fully engaged with the turf when the aerator (10) is in the operational position. The interior hollow of the drum may or may not coat the entire outer surface of the portion of the shaft (182) that is covered by the drum material (183). The drums (20) in the preferred embodiment are manufactured from High Density Polyethylene HDPE. It is understood that any other similar known material may be utilized to achieve the desired result.

Column 7, line 66 to column 8, line 26:

The transport position is achieved by pulling the lift handle (120), which increases the tension on the lift cable (122). The lift cable (122) increases tension on the lift actuation bracket (130), eventually overcoming the bias of the lift actuation bias spring (124), placing rotational pressure on the upper lift actuation lever (131) and, ultimately, resulting in lateral rotation of the lift actuation bar (128). Due to its angled profile, the lower lift actuation lever (132) is caused to rotate outwardly laterally away from the housing (30). The motion of the lower lift actuation lever (132) is transmitted to the locking latch (134), which captures the lower lift actuation lever (132) via a 'U' shaped tab (136). Thus, as the lower lift actuation lever (132) rotates laterally, the 'U' shaped tab on the locking latch [(136)] *(134)* is caused to rotate laterally through the [tab] *housing* aperture (137), which is visible in FIG. 6. FIG. 5A is a top fragmented view, which illustrates the locking latch (134) being held in the locked position by the lift actuation bias spring (124). This configuration corresponds to the transport position, with the transport wheels (14) rotated downward and underneath the aerator (10). FIG. 5B is a top fragmented view, which illustrates the locking latch (134) in the unlocked position. The bias of the lift actuation spring (124) is shown in FIG. 5B as having been overcome by increased tension of the lift cable (120), allowing the lift actuation bar (128) to rotate laterally. The 'U' shaped tab of the locking latch (136) is shown fully extended rotationally laterally through the housing aperture (137), visible in FIG. 6.

Column 8, lines 27-42:

The lateral rotation of the locking latch results in the disengagement of the locking latch upper lip (140) from the lift bracket recessed notch (150). The operator then lifts the steering handle (12) upward, with the assistance of the lift springs' (160) bias, causing the lift bracket operational stop [(152)] *(154)* to disengage from the operational stop bracket (166). The lifting operation continues until the locking latch lower lip (142) engages and locks the lift bracket step (148) and the lift bracket transport stop (152) engages the transport stop bracket (168). Concomitantly, the transport wheels (15) are caused to rotate forward and to move underneath the aerator frame (32) resulting in the aerator rising vertically with respect to the transport wheel axle (15) so that the tines (18) are disengaged from the turf. The machine (10) is now locked in the transport position with the tines (18) raised above the ground.

Column 8, line 43 to column 9, line 6:

The aerator (10) may now be moved by simply pushing it or by engaging the drive rollers (20) to power drive the aerator (10). To engage the drive rollers (20), the operator pulls the operational handle (40) back towards the steering handle (12), which results in the clutch control cable (76) causing the clutch actuation lever (74) to pivot upward, moving the clutch idler pulley (72) essentially vertically upward. When fully actuated, the clutch idler pulley (72) engages the outer surface *(64)* of the 'V' belt [(64)] *(60)*. This engagement results in a tensioning [the] of the 'V' belt (60) allowing the inner surface *(62)* of belt [(62)] *(60)* to fully engage the power take-off shaft pulley (68) and the differential shaft pulley (70). The rotation of the power take-off pulley (68) is transferred through the 'V' belt (60) to the differential shaft (42). The rotation of the differential shaft (42) is transferred to a differential shaft sprocket (84) mounted on the exterior portion of the frame (32). A pair of drive chains (80) each engage a differential sprocket (84) as well as a tine shaft [half] sprocket (86), a roller sprocket (88) and a tensioning sprocket (90). In the transport position, the tine shaft halves (47) rotate but do not engage the ground. The rollers (20) do, however, remain in contact with the ground. The rollers (20) receive the rotational power transfer from the differential shaft (42) via the drive chain (80) and sprocketing system (82). Thus, the aerator (10) is powered for walk-behind transport. It is understood that in an alternate embodiment, the differential shaft (42) could be operatively connected to the tine half shafts (47) and not to the rollers (20). In this alternate embodiment, the operator could then simply push the aerator (10) forward on its transport wheels (14) and rollers (20) when it is configured in the transport position.

Column 9, lines 7-16:

The operator has full control of the speed of the rotation of each roller drum (52, 54) when in the transport mode through use of the throttle (24), which increases the relative speed of the engine power take-off shaft (66), as well as with the right (100) and left (102) brake [handles] *levers*. The right brake (108) and left brake (110) control the speed of the right roller (54) and the left roller (52), respectively, as well as the right tine half shaft (50) and left tine half shaft (48), respectively, which continue to rotate in the transport position, by selectively slowing the differential rotation.

Column 9, lines 17-27:

Turns are accomplished by simply engaging the brake on the side to which the turn is desired to be made. A right hand turn is initiated by engaging the right hand brake (108) by actuating the right brake [handle] *lever* (100). This slows the right differential shaft portion (46), thus slowing the right roller (54) and right tine shaft half (50), causing the aerator (10) to turn to the right. A left hand turn is initiated by engaging the left hand brake (110) by actuating the left brake [handle] *lever* (102). This slows the left differential shaft portion (44), thus slowing the left roller (52) and left tine shaft half (48), causing the aerator (10) to turn to the left.

Column 9, lines 56-65:

The inventive design provides important safety features for the operator. Application of pressure to both brake [handles] *levers* (100, 102) at the same time, will effectively act as a braking means to stop the forward motion of the aerator (10) quickly. Additionally, the operator may disengage the clutch idler pulley (72) by allowing the operational handle (40) to release forward. This disengages the clutch idler pulley (72) from the 'V' belt (60), causing the differential shaft (42) to stop rotating. As a result, the tine shaft halves (47) and the rollers (20) stop rotating.

Column 9, line 66 to column 10, line 15:

Changing the aerator (10) from the transport position into the operational position, wherein the tines (18) are engaged in the turf, requires actuation of the lift handle (120) to increase the tension on the lift cable (122). When the tension on the lift cable (122) is sufficiently great, the cable (122) acts to disengage the locking latch [upper] *lower* lip [(140)] *142* from the lift bracket step (148). The operator then pushes downward on the steering handle (12), against the bias of the lift springs (160), causing the lift bracket transport stop (152) to disengage from the transport stop bracket (168) and the transport wheels (14) to rotate backward and allowing the frame (32) to lower vertically with respect to the transport wheel axle (15). The aerator (10) is in the operational position when the [lower] *upper* lip (*140*) of the locking latch [(142)] (*134*) engages the lift bracket recessed notch (150) and the lift bracket operational stop (154) engages the operational stop bracket (166). The tines (18) are now fully engageable with the turf.

AS A RESULT OF REEXAMINATION, IT HAS BEEN DETERMINED THAT:

Claim 1 is cancelled.

Claims 3, 5, 7, 26, 29, 32 and 34 are determined to be patentable as amended.

Claim 27, dependent on an amended claim, is determined to be patentable.

Claims 2, 4, 6, 8-25, 28, 30, 31, 33, 35 and 36 were not reexamined.

3. [The aerator of claim 1,] *A turf aerator, comprising:*
  a) *a frame;*
  b) *an engine mounted on the frame for powering the aerator having a power take-off shaft;*
  c) *a pair of tine shafts rotatably mounted in the frame, each tine shaft having a plurality of tines thereon for penetrating the turf and extracting soil plugs for aerating the turf;*
  d) *a differential shaft mounted to the frame operatively connected to and clutched with the power take-off shaft and further operatively connected to each tine shaft as to give variable rotation to each tine shaft;*
  e) *a steering handle, the steering handle being mounted to the frame and*
  f) *a pair of drive rollers rotatably mounted in the frame spaced from the pair of tine shafts, with the differential shaft further operatively connected to each drive roller to give variable rotation to each drive roller, with the steering handle controlling turning by applying directional force to the steering handle and controlling engagement and disengagement of the plurality of tines by lifting the steering handle upward or pushing downward on the steering handle;*
  further comprising a pair of roller shafts rotatably mounted in the frame with [a] *one of the pair of* drive [roller] *rollers* on each *roller* shaft and each roller shaft being operatively connected to a left side or a right side of the differential shaft, respectively.

5. [The aerator of claim 1,] *A turf aerator, comprising:*
  a) a frame;
  b) an engine mounted on the frame for powering the aerator having a power take-off shaft;
  c) a pair of tine shafts rotatably mounted in the frame, each tine shaft having a plurality of tines thereon for penetrating the turf and extracting soil plugs for aerating the turf;
  d) a differential shaft mounted to the frame operatively connected to and clutched with the power take-off shaft and further operatively connected to each tine shaft as to give variable rotation to each tine shaft;
  e) a steering handle, the steering handle being mounted to the frame and
  f) a pair of drive rollers rotatably mounted in the frame spaced from the pair of tine shafts, with the differential shaft further operatively connected to each drive roller to give variable rotation to each drive roller, with the steering handle controlling turning by applying directional force to the steering handle and controlling engagement and disengagement of the plurality of tines by lifting the steering handle upward or pushing downward on the steering handle;

further comprising a biased lifting assembly mounted to and below the frame for lifting and holding the tines out of the turf to place the aerator in a biased transportation mode from an operational mode, *with the operator lifting the steering handle upward to place the aerator in the biased transportation mode with the biased lifting assembly assisting the operator lifting the steering handle.*

7. [The aerator of claim 1.] *A turf aerator, comprising:*

*a) a frame;*

*b) an engine mounted on the frame for powering the aerator having a power take-off shaft;*

*c) a pair of tine shafts rotatably mounted in the frame, each tine shaft having a plurality of tines thereon for penetrating the turf and extracting soil plugs for aerating the turf;*

*d) a differential shaft mounted to the frame operatively connected to and clutched with the power take-off shaft and further operatively connected to each tine shaft as to give variable rotation to each tine shaft;*

*e) a steering handle, the steering handle being mounted to the frame and*

*f) a pair of drive rollers rotatably mounted in the frame spaced from the pair of tine shafts, with the differential shaft further operatively connected to each drive roller to give variable rotation to each drive roller, with the steering handle controlling turning by applying directional force to the steering handle and controlling engagement and disengagement of the plurality of tines by lifting the steering handle upward or pushing downward on the steering handle;* further comprising:

[a steering handle, the steering handle being mounted to the frame;]a pair of brake levers; and a pair of brake hand guards, the brake levers and hand guards being mounted on the steering handle.

26. A turf aerator, comprising:

a) a frame;

b) an engine mounted on the frame for powering the aerator having a power take-off shaft;

c) a pair of tine shafts rotatably mounted in the frame, each tine shaft having a plurality of tines thereon for *penetrating the turf and extracting soil plugs for* aerating the turf and differentially operatively connected to and clutched with the power take-off shaft as to give variable rotational *power* to each tine shaft; [and]

d) a biased lifting assembly with wheels mounted below the frame for lifting and holding the tines out of the turf to place the aerator in [the] *a* biased transportation mode from an operational mode;

*e) a steering handle, the steering handle being mounted to the frame; and*

*f) a pair of drive rollers rotatably mounted in the frame spaced from the pair of tine shafts, with each drive roller operatively connected to one of the pair of tine shafts, with the steering handle controlling turning by applying directional force to the steering handle and controlling engagement and disengagement of the plurality of tines by lifting the steering handle upward or pushing downward on the steering handle, with the operator lifting the steering handle upward to place the aerator in the biased transportation mode with the biased lifting assembly assisting the operator lifting the steering handle.*

29. The aerator of claim 26, further comprising a pair of roller shafts rotatably mounted in the frame with [a] *one of the pair of* drive [roller] *rollers* on each *roller* shaft and each roller shaft being operatively connected to a left side or a right side of the differential shaft, respectively.

32. The aerator of claim 26, further comprising:

[a steering handle, the steering handle being mounted to the frame;]

a pair of brake levers; and a pair of brake hand guards, the brake levers and hand guards being mounted to the steering handle.

34. A turf aerator, comprising:

a) a frame;

b) an engine mounted on the frame for powering the aerator having a power take-off shaft;

c) a pair of tine shafts rotatably mounted in the frame, each tine shaft having a plurality of tines thereon for aerating the turf;

d) a differential shaft with a left side and a right side mounted to the frame operatively connected to and clutched with the power take-off shaft and further operatively connected to each tine shaft as to give variable rotation to each tine shaft;

e) left side and right side hand-activated brakes on each side of the differential shaft to variably control the rotation of the differential shaft;

f) a pair of roller shafts rotatably mounted to the frame with a drive roller on each *roller* shaft and each roller shaft being operatively connected to the left side or the right side of the differential shaft, respectively, wherein the drive rollers are molded directly to the roller shafts and wherein the drive rollers and roller shafts are sufficiently massive such that the addition of water to the drive rollers, or other weighting method, is not required to facilitate penetration of the tines into the turf;

g) a biased lifting assembly mounted to and below the frame for lifting and holding the tines out of the turf to place the aerator in a biased transportation mode from an operational mode;

h) brake levers and brake hand guards, the brake levers and hand guards being mounted on a steering handle, the steering handle being mounted to the frame; and i) a differential shaft coupling disposed on the differential shaft, wherein the coupling allows for disassembly of the differential shaft for maintenance and servicing.

* * * * *